US011720011B2

(12) United States Patent
McIntosh

(10) Patent No.: US 11,720,011 B2
(45) Date of Patent: *Aug. 8, 2023

(54) PROJECTION SYSTEM FOR BABY-CHANGING STATION TRANSLUCENT DISPLAYS AND METHODS OF OPERATING THEREOF

(71) Applicant: The Boeing Company, Chicago, IL (US)

(72) Inventor: Darren Carl McIntosh, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,175

(22) Filed: Jan. 21, 2022

(65) Prior Publication Data

US 2022/0146923 A1    May 12, 2022

Related U.S. Application Data

(63) Continuation of application No. 16/946,097, filed on Jun. 5, 2020, now Pat. No. 11,262,646, which is a
(Continued)

(51) Int. Cl.
*G03B 21/62* (2014.01)
*G03B 21/625* (2014.01)
(Continued)

(52) U.S. Cl.
CPC ......... *G03B 21/625* (2013.01); *A47D 5/003* (2013.01); *G03B 21/142* (2013.01); *G03B 21/145* (2013.01); *G03B 21/28* (2013.01)

(58) Field of Classification Search
CPC .. H04N 9/3105; H04N 9/3114; H04N 9/3147; H04N 9/3152; H04N 9/3161;
(Continued)

(56) References Cited

U.S. PATENT DOCUMENTS 7,222,820 B2 * 5/2007 Wentland ............... B64D 11/02
244/129.1
7,419,265 B2    9/2008 Relke et al.
(Continued)

FOREIGN PATENT DOCUMENTS

DE    102007009378 A1    8/2008

OTHER PUBLICATIONS

European Extended Search Report regarding European Patent Application No. 21170879.7 dated Oct. 11, 2021, 3 pp.

*Primary Examiner* — Sultan Chowdhury
(74) *Attorney, Agent, or Firm* — Armstrong Teasdale LLP

(57) ABSTRACT

A system is provided. The system includes a translucent display positioned such that a first face is a display face and that a second face is a projection face and at least one projector configured to project an image on the second face of the translucent display. The image is displayed on the first face. The system also includes at least one sensor configured to transmit a signal when triggered and a projector controller in communication with the at least one projector and the at least one sensor. The projector controller is programmed to receive a signal from the at least one sensor and instruct the at least one projector to project at least one image on the translucent display in response to the signal from the at least one sensor.

20 Claims, 26 Drawing Sheets

Related U.S. Application Data continuation-in-part of application No. 15/929,661, filed on May 14, 2020, now Pat. No. 11,178,365.

(51) Int. Cl.

| | | |
|---|---|---|
| *A47D 5/00* | (2006.01) | |
| *G03B 21/14* | (2006.01) | |
| *G03B 21/28* | (2006.01) | |

(58) Field of Classification Search
CPC ...... H04N 9/3164; B64D 11/00; B64D 11/02; B64D 11/0015; B64D 11/0689; G03B 21/62; G03B 21/142; G03B 21/145; G03B 21/147; G03B 21/625; G03B 21/2013; G03B 21/2033; G03B 21/2053; G01G 19/44; G01G 19/52; G01G 19/415; G01G 19/445; A47D 5/00; A47D 5/003; A47D 5/005; A47D 5/006
See application file for complete search history.

(56) References Cited

U.S. PATENT DOCUMENTS

| | | |
|---|---|---|
| 8,035,624 B2 | 10/2011 | Bell et al. |
| 8,100,540 B2 | 1/2012 | Huebner |
| 8,427,395 B2 | 4/2013 | Seder et al. |
| 8,564,502 B2 | 10/2013 | Cui et al. |
| 8,692,739 B2 | 4/2014 | Mathieu et al. |
| 10,191,364 B2 | 1/2019 | Christensen |
| 10,604,271 B2 | 3/2020 | Breigenzer |
| 2006/0072076 A1 | 4/2006 | Smoot et al. |
| 2006/0225625 A1* | 10/2006 | Bazzell ................ B60N 3/002 108/42 |
| 2009/0112638 A1 | 4/2009 | Kneller et al. |
| 2009/0292614 A1 | 11/2009 | Reichow et al. |
| 2012/0060271 A1* | 3/2012 | Dannenberg ........... B64D 11/02 4/321 |
| 2012/0221192 A1* | 8/2012 | Seibt ................ G01N 21/6456 296/24.3 |
| 2012/0287502 A1 | 11/2012 | Hajjar |
| 2013/0016197 A1 | 1/2013 | Koo |
| 2016/0059965 A1 | 3/2016 | Koyama et al. |
| 2018/0106664 A1 | 4/2018 | Bottomly |
| 2018/0275504 A1 | 9/2018 | Ono et al. |
| 2019/0300174 A1 | 10/2019 | Young et al. |
| 2020/0208382 A1 | 7/2020 | Guering et al. |
| 2020/0371645 A1 | 11/2020 | Spencer et al. |

* cited by examiner

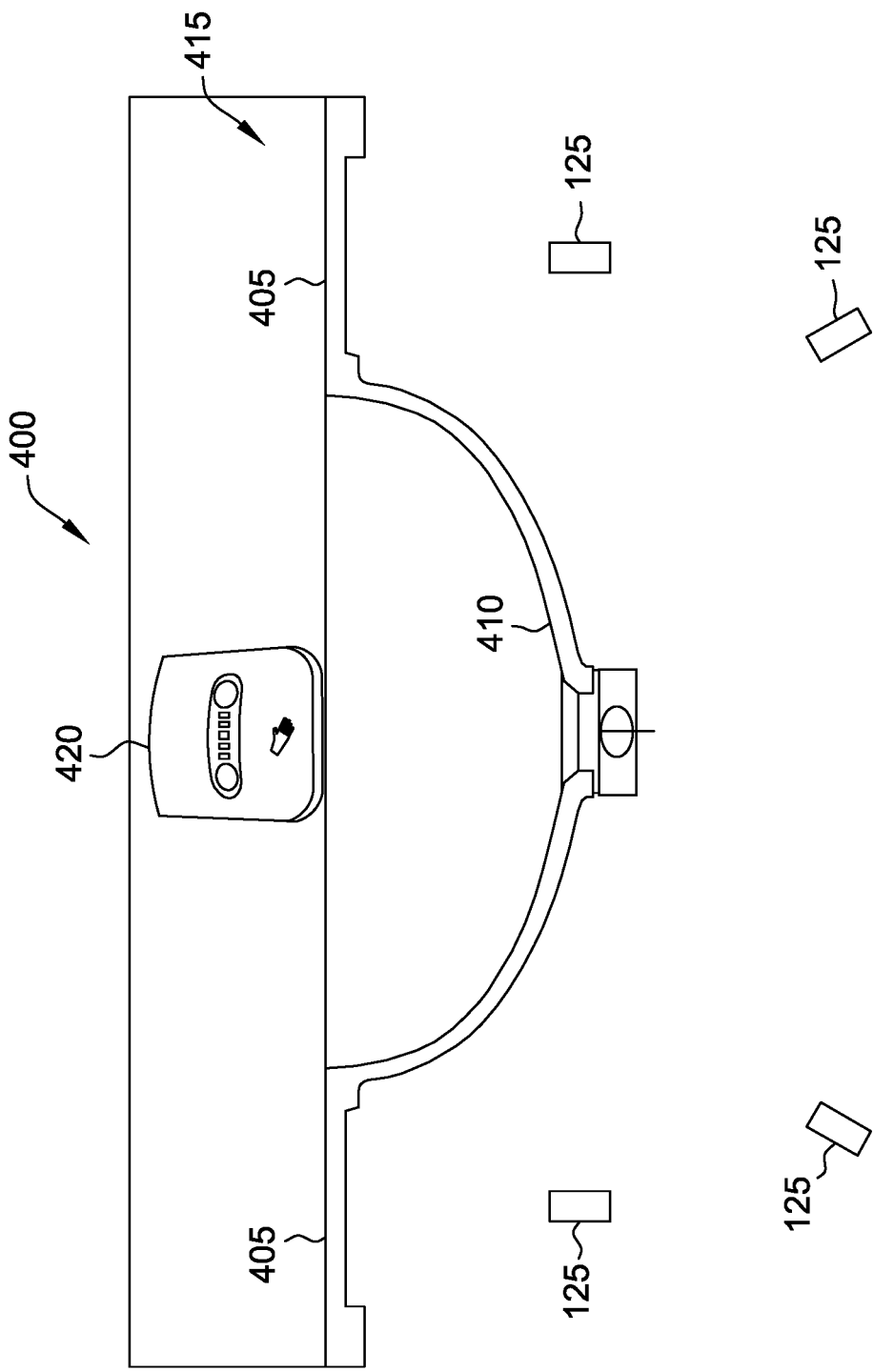

PROJECTION SYSTEM FOR BABY-CHANGING STATION TRANSLUCENT DISPLAYS AND METHODS OF OPERATING THEREOF

CROSS REFERENCE TO RELATED APPLICATIONS

This application is a continuation of U.S. patent application Ser. No. 16/946,097, filed on Jun. 5, 2020, which is a continuation-in-part of U.S. patent application Ser. No. 15/929,661 filed on May 14, 2020, which issued as U.S. patent Ser. No. 11,178,365 on Nov. 16, 2021, which are hereby incorporated by reference in their entirety.

BACKGROUND

The field of the present disclosure relates generally to translucent projection systems and, more specifically, to projecting images and video onto translucent displays incorporated into baby-changing stations.

Many purchasers of aircraft and other fleet vehicles require that the vehicle be personalized for their brand or image. In many cases, this includes having logos or images on different surfaces of the vehicle. However, many of these customizations are expensive and would have to be removed if the vehicle is resold. These customizations also require special set-ups on the assembly lines, which then slows down the production process. Furthermore, these customizations would need to be implemented in areas with limited space for additional equipment. One particular area of customization is the lavatories of the vehicles, where the purchasers are looking for distinct features to increase their visibility and the comfort of their passengers. Accordingly, it would be advantageous to have a system that allows for customization of surfaces on vehicles without requiring changes to the production of the vehicle.

BRIEF DESCRIPTION

In one aspect, a system is provided. The system includes a baby-changing station including a translucent display. The baby-changing station is configured to be moveable between a first position and a second position. The system also includes at least one projector configured to project an image on the translucent display. The system further includes at least one sensor configured to indicate a current position of the baby-changing station. In addition, the system includes a projector controller in communication with the at least one projector and the at least one sensor. The projector controller is programmed to instruct the at least one projector to project at least one image on the translucent display when the baby-changing station is in the first position. The projector controller is also programmed to receive a signal from the at least one sensor indicating that the baby-changing station is in between the first position and the second position. The projector controller is further programmed to instruct the at least one projector to halt projection of images.

In another aspect, a method for operating a projector system is provided. The method is implemented by a computing device including at least one processor in communication with at least one memory device. The method includes receiving a first signal from a first sensor, determining a first projection sequence to activate in response to the first signal from the first sensor, and determining a first translucent display and a corresponding first projector to display the first projection sequence in response to the first signal from the first sensor. The first translucent display is a baby-changing station in a stowed position. The method also includes transmitting instructions to the first projector to project the first projection sequence onto a projection face of the first translucent display, such that the first projection sequence is displayed on a display face of the first translucent display. The projection face is an opposite side of the first translucent display from the display face of the first translucent display. The method further includes receiving a second signal from a second sensor indicating a change in position of the first translucent display, determining to halt projection of the first projection sequence in response to the second signal, and transmitting instructions to the first projector to halt projection of the first projection sequence.

In a further aspect, a lavatory is provided. The lavatory includes a baby-changing station including a translucent display. The translucent display includes a first face, and an opposite second face. The first face is visible. The baby-changing station is attached to a wall of the lavatory. The baby-changing station is configured to transition between a stowed position and a deployed position. The lavatory also includes a projector positioned behind the wall that the baby-changing station is attached to. The projector is configured to project on the second face of the translucent display. The lavatory further includes at least one sensor configured to determine a current position of the baby-changing station. In addition, the lavatory includes a computing device including at least one processor in communication with at least one memory device. The computing device is in communication with the at least one sensor and the projector. The at least one processor is programmed to receive a signal from the at least one sensor indicating that the baby-changing station is in the stowed position, instruct the projector to project at least one image on the translucent display, receive a signal from the at least one sensor indicating that the baby-changing station is no longer in the stowed position, and instruct the projector to halt projection of the at least one image.

BRIEF DESCRIPTION OF THE DRAWINGS

FIGS. 4A and 4B illustrate a cross-sectional view of a sink-based projector system in accordance with at least one example.

DETAILED DESCRIPTION

Figure 1:
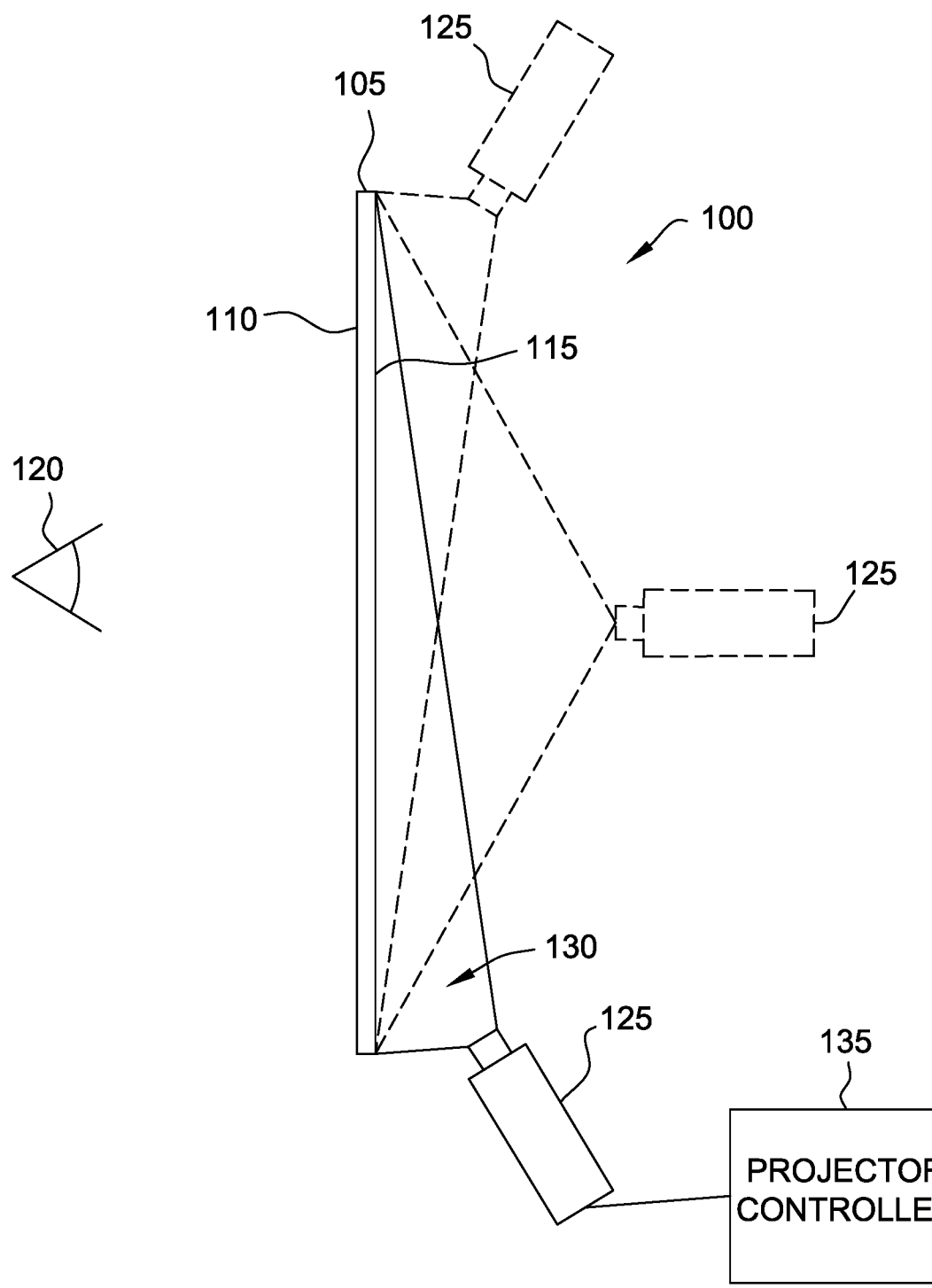
FIG. 1 illustrates a projector system for projecting an image onto a translucent display in accordance with one example of the present disclosure.

The implementations described herein relate to systems and methods for analyzing images and, more specifically, to translucent projection systems and, more specifically, to projecting images and video onto a translucent display incorporated into a baby-changing station constructed of one or more translucent materials. For the purposes of this discussion, a translucent material or display permits light to pass through, but diffuses the light so that objects on the opposite side are not clearly visible. In some examples, the translucent display is made from a material comprising an acrylic polymer and alumina trihydrate (ATH) similar to that of Conan®, created by E.I. duPont de Nemours and Company, Wilmington, Del., (DuPont) which is a solid material.

In particular, the translucent projection system includes a projector, such as a short-throw projector is controlled by a projector controller computer device. The projector controller computer device controls the projector as it transmits images to display on the translucent display. The projector projects the image on a projection face of the translucent display to be displayed through the translucent display on the display face of the translucent display. By projecting onto the projection face of the translucent display, there are no obstructions between the projector and the translucent display being projected onto. This prevents individuals from interposing between the projector and the display being projected onto, thus preventing shadows and other obstructions from obscuring the image. The projector is also hidden away from the viewer to increase the viewing experience. Furthermore, the projectors can be configured to display desired images, allowing for customization without requiring additional equipment. In addition the images can be changed when desired. The projectors can be configured to display images, series of images, videos, and/or animations.

In the case of a baby-changing station, the projector controller computer device is in communication with one or more sensors that inform the projector controller computer device if the baby-changing station is in an up or stowed position or if the baby-changing station is in the down or deployed position. The projector controller computer device instructs the projector to display an image when the baby-changing station is in the up or stowed position and to discontinue projection when the baby-changing station is in the down or deployed position. While a baby-changing station is used as an example implementation herein, after reading this specification it will be recognized other implementations and applications are within the scope of the present disclosure, including but not limited to other stowable support surfaces such as trays, tables, workstations, among others.

Described herein are computer systems such as the projector controller computer devices and related computer systems. As described herein, all such computer systems include a processor and a memory. However, any processor in a computer device referred to herein can also refer to one or more processors wherein the processor can be in one computing device or a plurality of computing devices acting in parallel. Additionally, any memory in a computer device referred to herein can also refer to one or more memories wherein the memories can be in one computing device or a plurality of computing devices acting in parallel.

As used herein, a processor can include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" can refer to either a body of data, a relational database management system (RDBMS), or to both. As used herein, a database can include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Wash.). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, Calif.). In yet a further example, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some examples, the system includes multiple components distributed among a plurality of computer devices. One or more components can be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present examples can enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The systems and processes are not limited to the specific examples described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

FIG. 1 illustrates a projector system 100 for projecting an image onto a translucent display 105 in accordance with the present disclosure. In the example, a translucent display 105 includes a translucent material that allows light to pass through, but is semi-transparent. For the purposes of this discussion, a translucent material or display permits light to pass through, but diffuses the light so that objects on the opposite side are not clearly visible. In some examples, translucent display 105 is made from a material comprising an acrylic polymer and alumina trihydrate (ATH) similar to that of Conan®, created by E. I. duPont de Nemours and Company, Wilmington, Del., (DuPont) which is a solid material.

In the example, translucent display 105 includes a display face 110 and a projection face 115, where the display face 110 faces a viewer (or observer) 120 and the projection face 115 faces one or more projectors 125. While the projector 125 shown in FIG. 1 is below the translucent display 105, the one or more projectors 125 can also be positioned above the translucent display 105, to any side of the translucent display 105, or even directly behind the translucent display 105. The one or more projectors 125 are configured to project images 130 onto the projection face 115 of translucent display 105. The image 130 is then viewed by the viewer 120 through the translucent display 105. In the example, the projector 125 projects the image 130 in reverse, so that it can be displayed in the proper orientation by the viewer 120. In the example, the projector 125 is at least one of a short-throw projector, an ultrashort-throw projector, a GOBO (goes before objects) projector, or other projector that works as described herein. The term GOBO (Go Before Optics) specifically refers to a device placed in "the gate" or at the "point of focus" between the light source and the lenses (or other optics). In the example, the projector 125 is only a short distance from the translucent display 105 and is configured to project on translucent display from that close distance. Furthermore, the projector 125 is configured to project onto curved or uneven surfaces, so that the image 130 does not appear distorted to the viewer 120. In this example, the projector 125 is programmed to adjust the image 130 that is projected to the contours and shape of the translucent display 105 that is being projected on to avoid skew. This adjustment can be made when the projector 125 is originally configured while being installed. In addition, the projector 125 is also configured to use keystone image correction techniques for where the projector 125 is at an angle to the projection face 115 of the translucent display 105.

The projector 125 is controlled by a projector controller 135. The projector controller 135 instructs the projector 125 as to which images 130 to project and when to project those images. The projector controller 135 can provide images to the projector 125. The projector controller 135 can also provide images that have been adjusted to the contours of the translucent display 105 to the projector 125. If the projector controller 135 determines that it is appropriate to go into a sleep mode, the projector controller 135 would then instruct the projector 125 to stop projecting images 130 to conserve energy, to reduce heat, and/or to reduce wear and tear on the projector 125. The projector controller 135 can activate sleep mode a predetermined period of time after a sensor signal has been received, after a series of images have been displayed a predetermined period of time, after a specific sensor signal has been received, or based on a command from one or more other computer devices. In some examples, the projector controller 135 is a part of the projector 125. In other examples, the projector controller 135 is separate from and in communication with the projector 125. In some further examples, the projector controller 135 controls multiple projectors 125.

Figure 2:
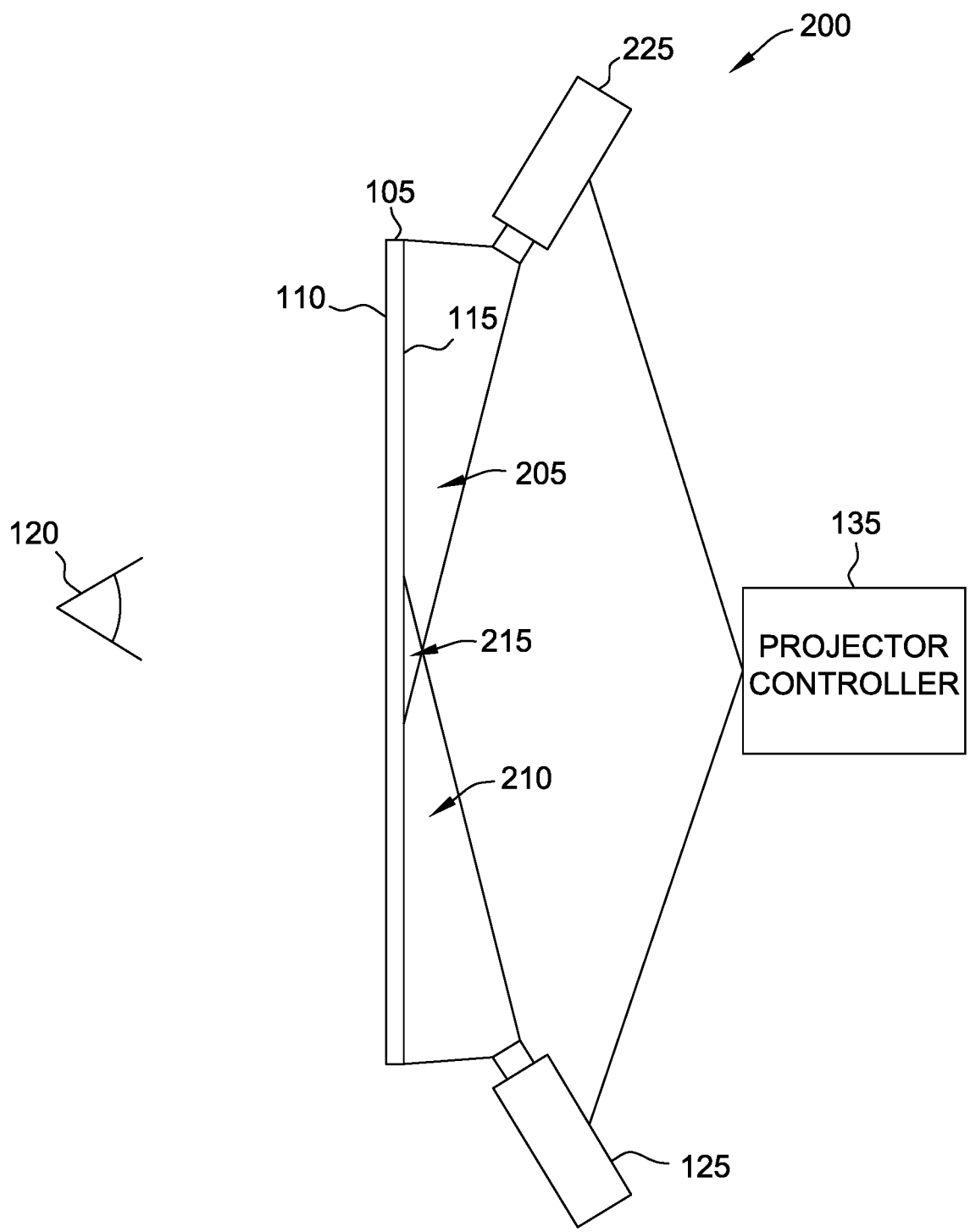
FIG. 2 illustrates another projector system for projecting an image onto a translucent display in accordance with one example of the present disclosure.

FIG. 2 illustrates a block diagram of another projector system 200 for projecting an image onto a translucent display 105 in accordance with another example of the present disclosure. In projector system 200, translucent display 105 includes a display face 110 and a projection face 115. The display face 110 faces a viewer (or observer) 120.

Projector system 200 also includes a plurality of projectors 125. Each of the plurality of projectors 125 are configured to project images 205 and 210 onto the projection face 115 of the translucent display 105. The projector controller 135 controls each of the projectors 125 to determine which part of the image 210 for each projector 125 to display based on the size and shape of the translucent display 105.

Furthermore, the projectors 125 are configured to project the image 210 to include an overlap area 215. The overlap area 215 combines the images 210 of the two projectors 125 to create a seamless image, so that there is no visible difference to the viewer 120 between the images 205. The projector controller 135 is programmed to control the plurality of projectors 125. The projector controller 135 instructs each projector 125 which image 205 and 210 to project and what to project in the overlap area 215. The projector controller 135 can use color matching and edge blending techniques to illuminate the overlap area 215 so that there is no visible difference to the viewer 120 between the image 205 and 210 and the overlap area 215.

Figure 3:
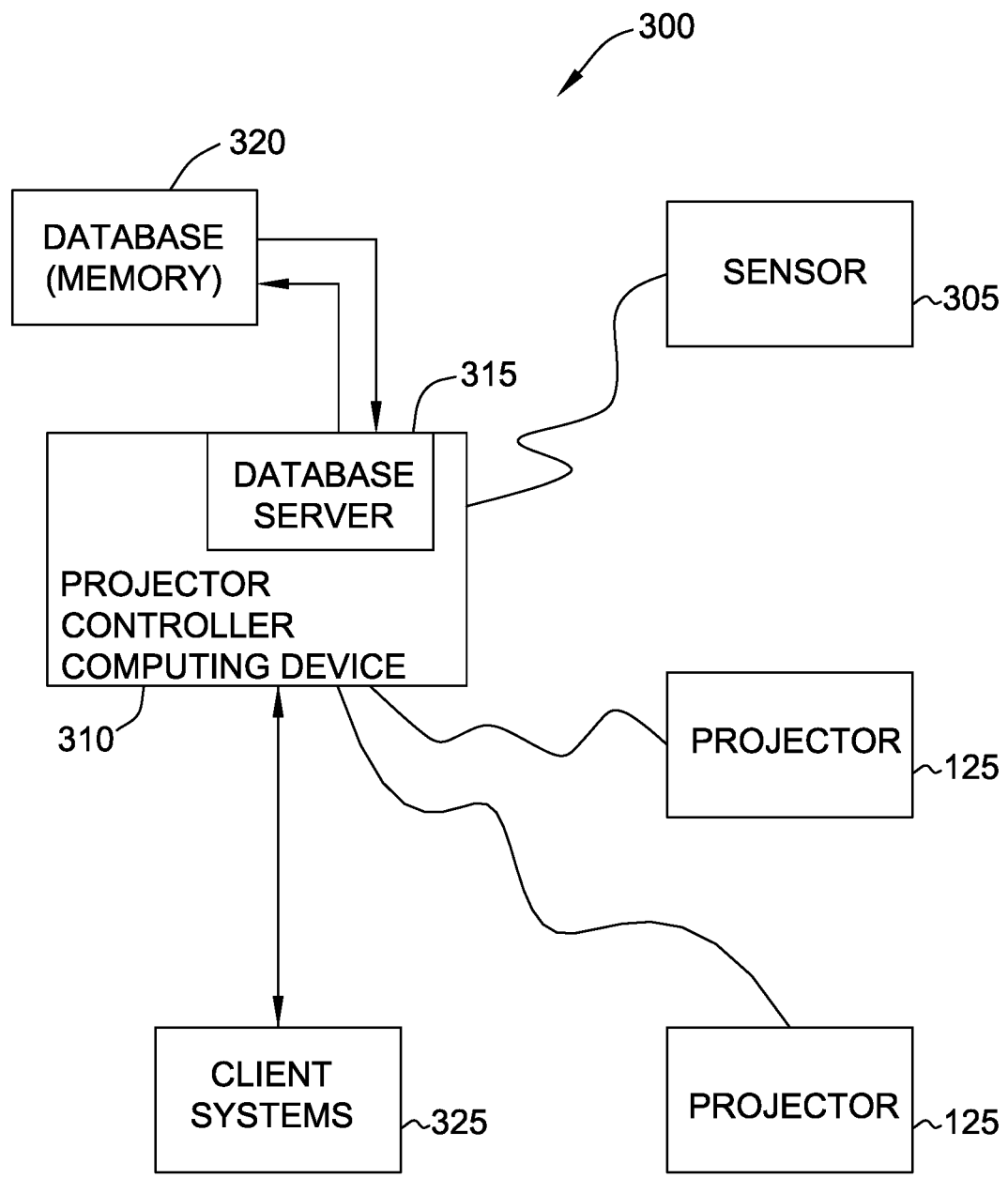
FIG. 3 is a simplified block diagram of an example projector system for executing the projector systems shown in FIGS. 1 and 2.

FIG. 3 is a simplified block diagram of an example projector system 300 for executing the projector systems 100 and 200 (shown in FIGS. 1 and 2). In the example, the projector system 300 is used for controlling projectors 125. The projector system 300 is a projector controlling computer system that includes a projector controller computer device 310 (also known as a projector controller server) configured to project images onto surfaces. In some examples, the projector controller computer device 310 is programmed to control one or more projectors 125 based on data received from one or more sensors 305. In the example, projector controller computer device 310 is similar to projector controller 135 (shown in FIG. 1).

Projectors 125 are configured to project an image 130 onto the projection face 115 of a translucent display 105 so that the image 130 is displayed on the display face 110 of the translucent display 105 (all shown in FIG. 1).

In projector system 300, sensors 305 receive signals about the actions of a user. The sensors 305 can include, but are not limited to, faucet sensors, door lock sensors, flush button sensors, automatic paper towel dispenser sensor, motion sensors, infrared sensors, light sensors, and or any other sensor that allows the projector system 300 to operate as described herein. Sensors 305 connect to projector controller computer device 310 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensors 305 receive data about the activities of the user or system, and report those conditions to projector controller computer device 310. In other examples, sensors 305 are in communication with one or more client systems 325. In some examples, sensors 305 are in direct communication with one or more projectors 125, where the projectors 125 are directly activated based on the signals provided by the sensors 305. For example, a projector 125 can activate when a motion sensor detects movement.

In the example, client systems 325 are computers that include a web browser or a software application, which enables client systems 325 to communicate with projector controller computer device 310 using the Internet, a local area network (LAN), or a wide area network (WAN). In some examples, the client systems 325 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 325 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one example, one or more client systems 325 are associated with aircraft operation, such as for when to illuminate a return to seat image. In another example, the client system 325 provides real-time information, such as financial news to the projector controller computer device 310; so that the projector controller computer device 310 can instruct one or more projectors 125 to display the financial news on a translucent display 105.

A database server 315 is communicatively coupled to a database 320 that stores data. In one example, the database 320 is a database that includes a plurality of projector settings, a plurality of projection sequences, and additional information for projection. In some examples, the database 320 is stored remotely from the projector controller computer device 310. In some examples, the database 320 is decentralized. In the example, a person can access the database 320 via the client systems 325 by logging onto projector controller computer device 310.

Figure 4B:
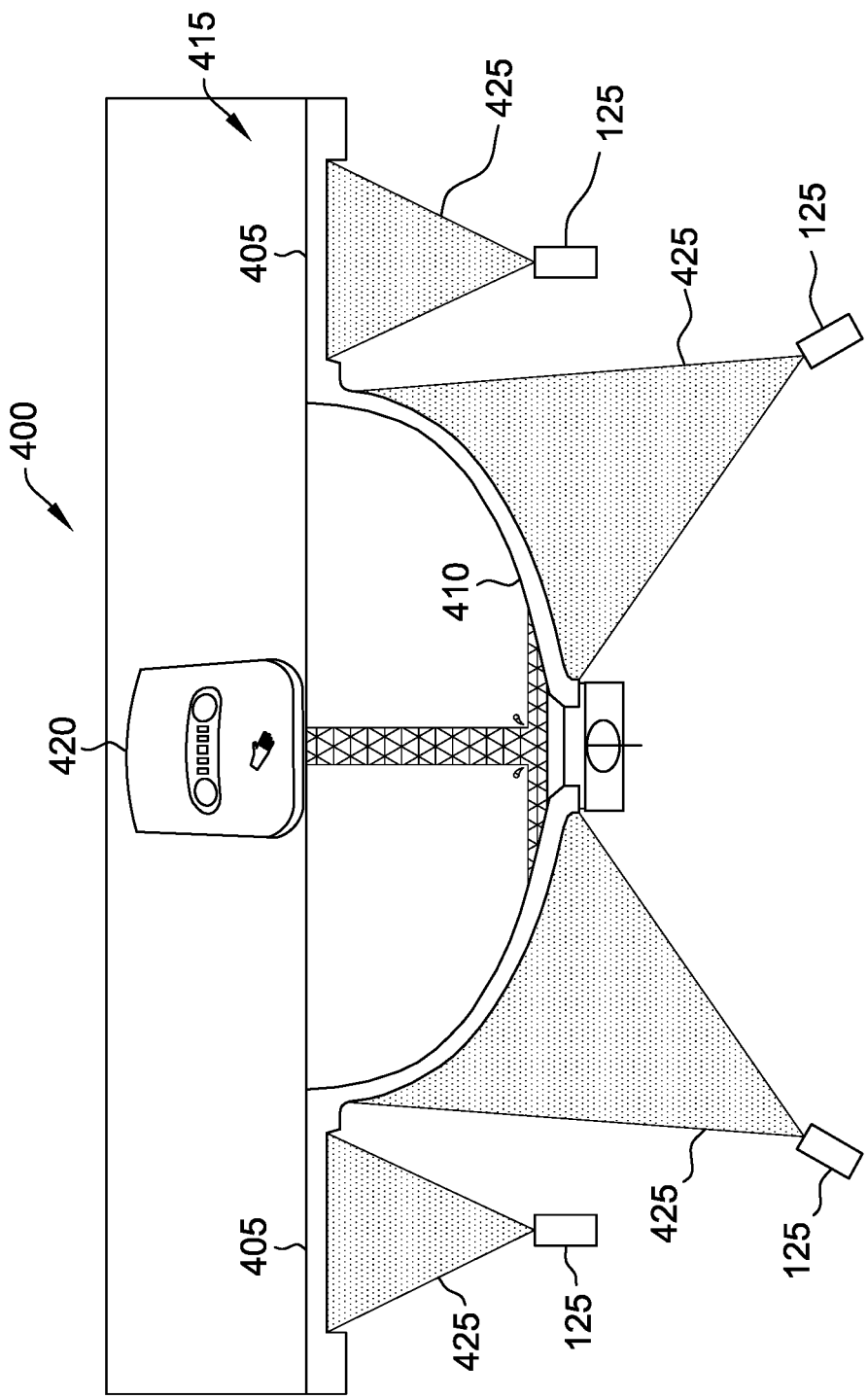

FIGS. 4A and 4B illustrate a cross-sectional view of a sink-based projector system 400 in accordance with at least one example. FIGS. 4A and 4B illustrate a cross-sectional view of the sink-based projector system 400. The sink-based projector system 400 includes countertops 405, a sink area 410, and a splash back area 415. In the example, the sink-based projector system 400 also includes one or more projectors 125 configured to project images 425 onto one of more of the countertops 405, the sink area 410, and the splash back area 415.

In the example, the projectors 125 are configured to project their images when triggered by a triggering device 420, such as a faucet sensor. The triggering device 420 can include one or more sensors 305 (shown in FIG. 3), such that the sensors 305 report a current status of the triggering device 420 (aka on or off). In the sink-based projector system 400, the triggering device 420 is a faucet sensor that detects when a person places their hands near the sink area 410. The triggering device 420 then triggers water to be dispensed into the sink. The triggering device 420 transmits a signal to the projector controller 135 (shown in FIG. 1), which controls the projectors 125. The projector controller 135 instructs the projectors 125 to display one or more images 425. The projector controller 135 can also poll each triggering device 420 to determine a current state of the triggering device 420, such as actively dispensing water through the faucet.

Figure 4C:
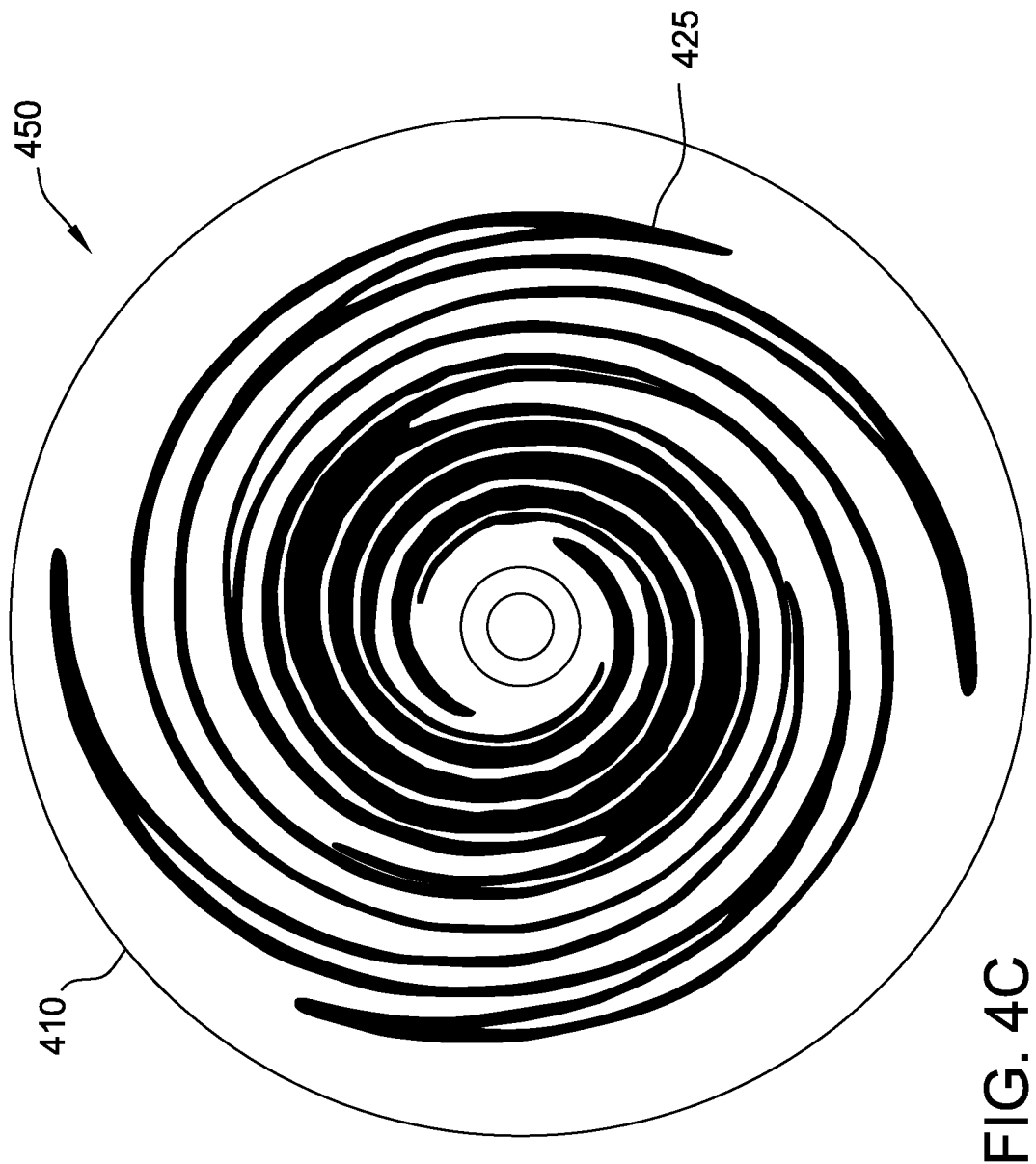
FIG. 4C illustrates an overhead view of operation of the sink-based projector system shown in FIGS. 4A and 4B.

FIG. 4C illustrates an overhead view 450 of operation of the sink-based projector system 400 (shown in FIGS. 4A and 4B). In this overhead view 450, an image 425 of swirling water, as an example, is being projected onto the sink area 410.

Figure 5:
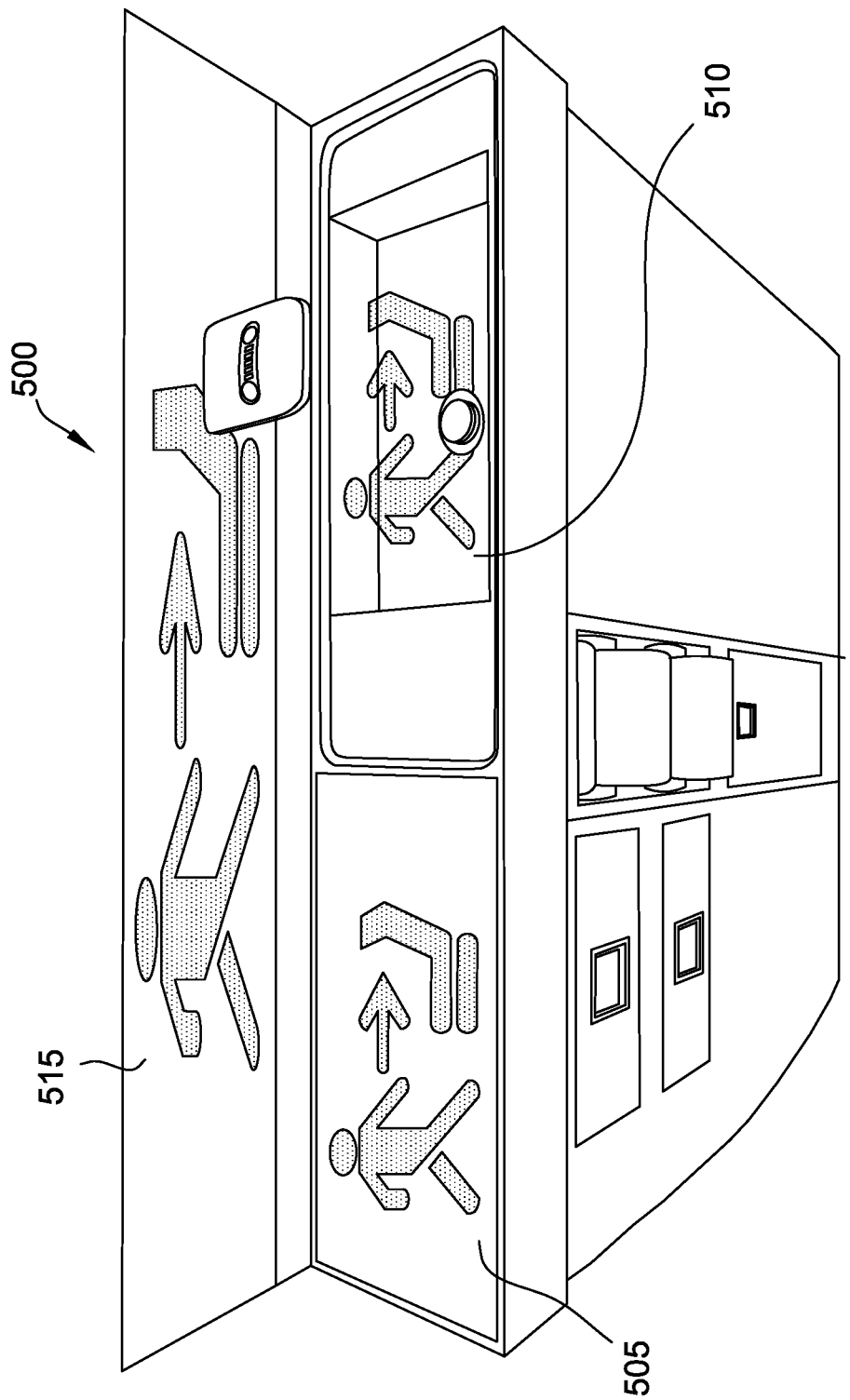
FIG. 5 illustrates a view of a lavatory using the projector systems shown in FIGS. 1, 2, and 3.

FIG. 5 illustrates a view 500 of a lavatory using projector systems 100, 200, and 300 (shown in FIGS. 1, 2, and 3, respectively). View 500 shows multiple display faces 110 of translucent display 105 (shown in FIG. 1) with projected images, including a countertop face 505, a sink area face 510, and a splash back area face 515. All three of these faces 505, 510, and 515 are displaying an image 130 (shown in FIG. 1) instructing the viewer 120 (shown in FIG. 1) to return to their seat, such as in an aircraft lavatory.

In other situations, other images 130 can be displayed on the faces 505, 510, and 515, such as, but not limited to, branding and logos, destination theming, trip progress information, news, emergency instructions, financial data (e.g., stock ticker information), video clips, and/or any other images or video desired. These images 130 can be displayed based on activation of a triggering device 420 (shown in FIG. 4), a control signal from projector controller 135 (shown in FIG. 1), and a signal from a client system 325 (shown in FIG. 3). In a first example, the projector controller 135 receives a signal from triggering device 420 that the triggering device 420 was activated. This signal causes the projector controller 135 to instruct one or more projectors 125 to project images 130 onto one or more faces 505, 510, and 515. In a second example, the projector controller 135 determines that a predetermined time period has been exceeded since the last signal from a sensor 305 or triggering device 420 and determine to instruct the projectors 125 to stop displaying image 130. In a third example, the projector controller 135 can receive a signal from a client system 325 instructing projector controller 135 to instruct the projectors 125 to display the return to seat image 130 on each face 505, 510, and 515.

Figure 6:
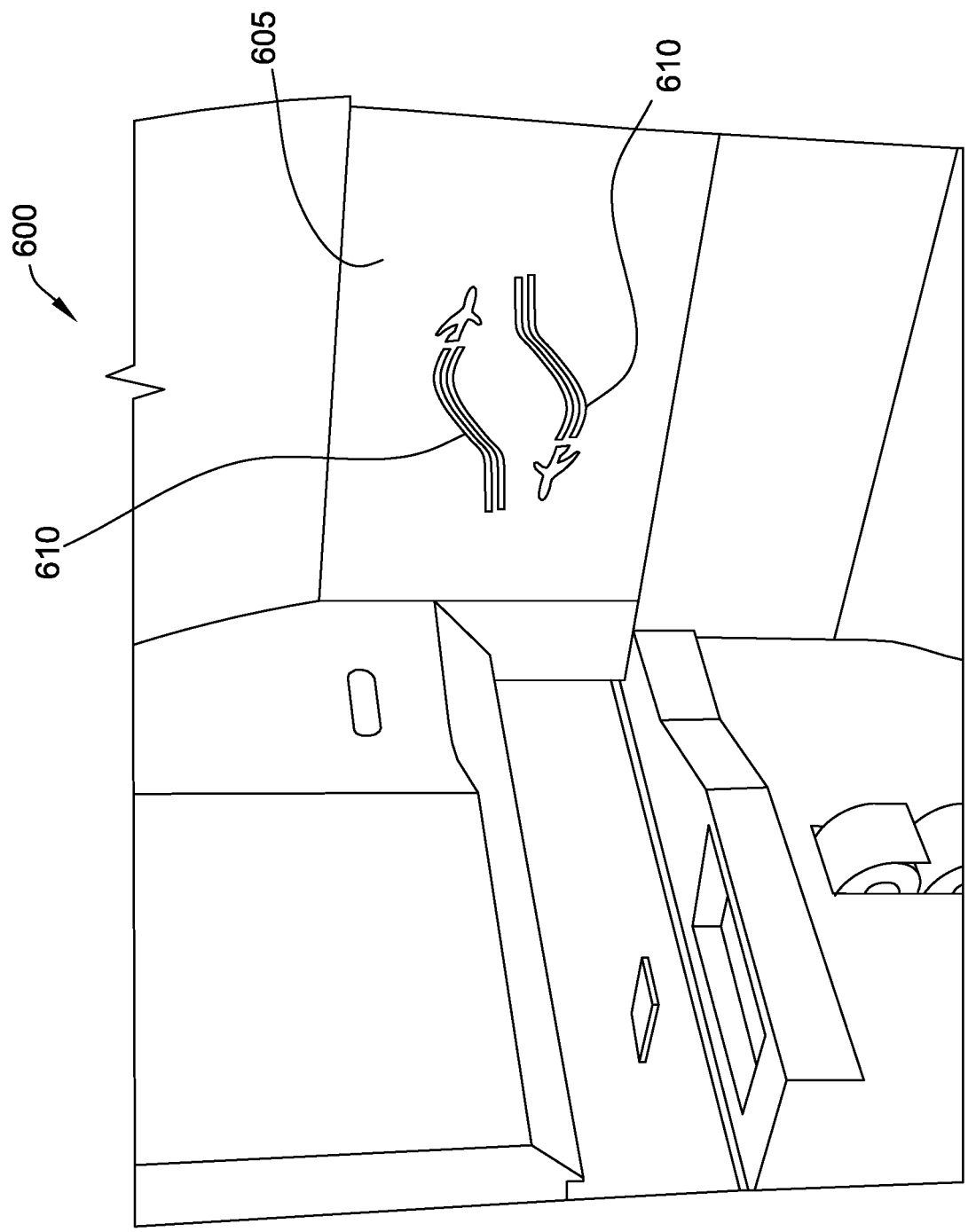
FIG. 6 illustrates another view of a lavatory using the projector systems shown in FIGS. 1, 2, and 3.

FIG. 6 illustrates a view 600 of a lavatory using projector systems 100, 200, and 300 (shown in FIGS. 1, 2, and 3, respectively). In view 600, a projector 125 (shown in FIG. 1) is hidden in the wall behind a baby-changing station 605. The baby-changing station 605 is a translucent display 105 (shown in FIG. 1) and made of a translucent material. The projector 125 projects an image 610 on the surface of the baby-changing station 605 while the baby-changing station 605 is in the up or stowed position. In the example, the projector 125 stops projecting image 610 when the baby-changing station 605 is opened or in the down or deployed position. In other examples, the projector 125 is in baby-changing station 605 and the bottom surface of baby-changing station 605 is a translucent display 105. In some examples, the projector 125 begins projecting image 610 when a viewer 120 (shown in FIG. 1) is detected. For example, when the lock on the lavatory is put in the lock position and the lock includes a triggering device 420 (shown in FIG. 4A). The triggering device 420 transmits a signal to the projector controller 135 (shown in FIG. 1) to instruct the projectors 125 to display image 610 on the baby-changing station 605. The projector controller 135 can also receive a signal from a triggering device 420 associated with the baby-changing station 605 to determine whether the baby-changing station 605 is in an up or stowed position or a down or deployed position.

While a baby-changing station is used as an example implementation herein, after reading this specification it will be recognized other implementations and applications are within the scope of the present disclosure, including but not limited to other stowable support surfaces such as trays, tables, workstations, among others.

Figure 7A:
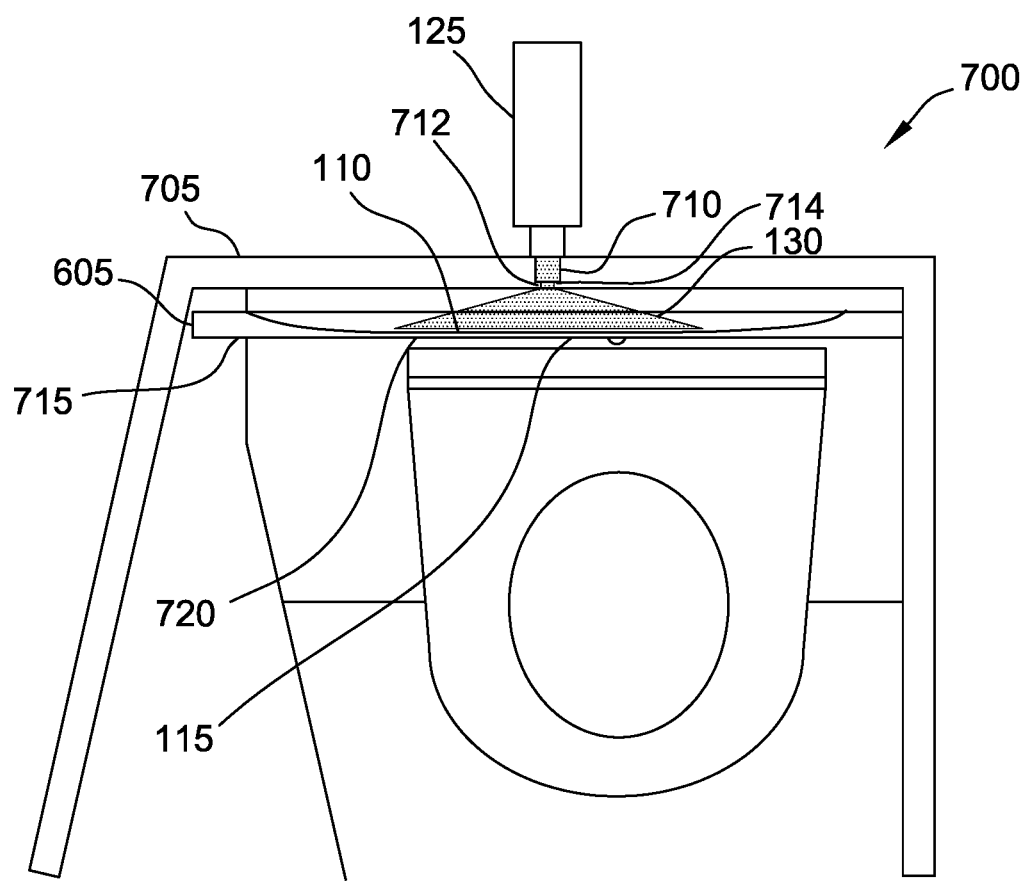
FIGS. 7A-7C illustrate an overhead view of the baby-changing station including a translucent display using the projector systems shown in FIGS. 1, 2, and 3.
Figure 7B:
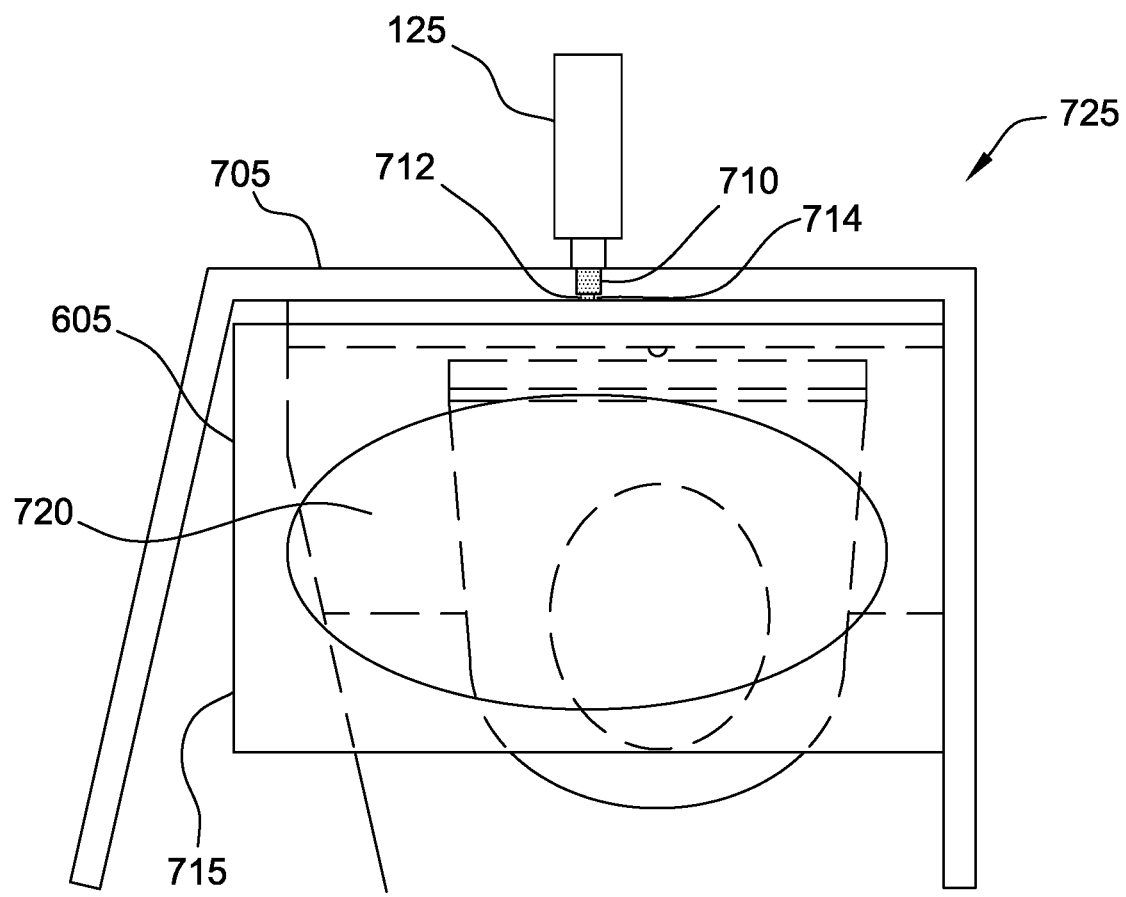
Figure 7C:
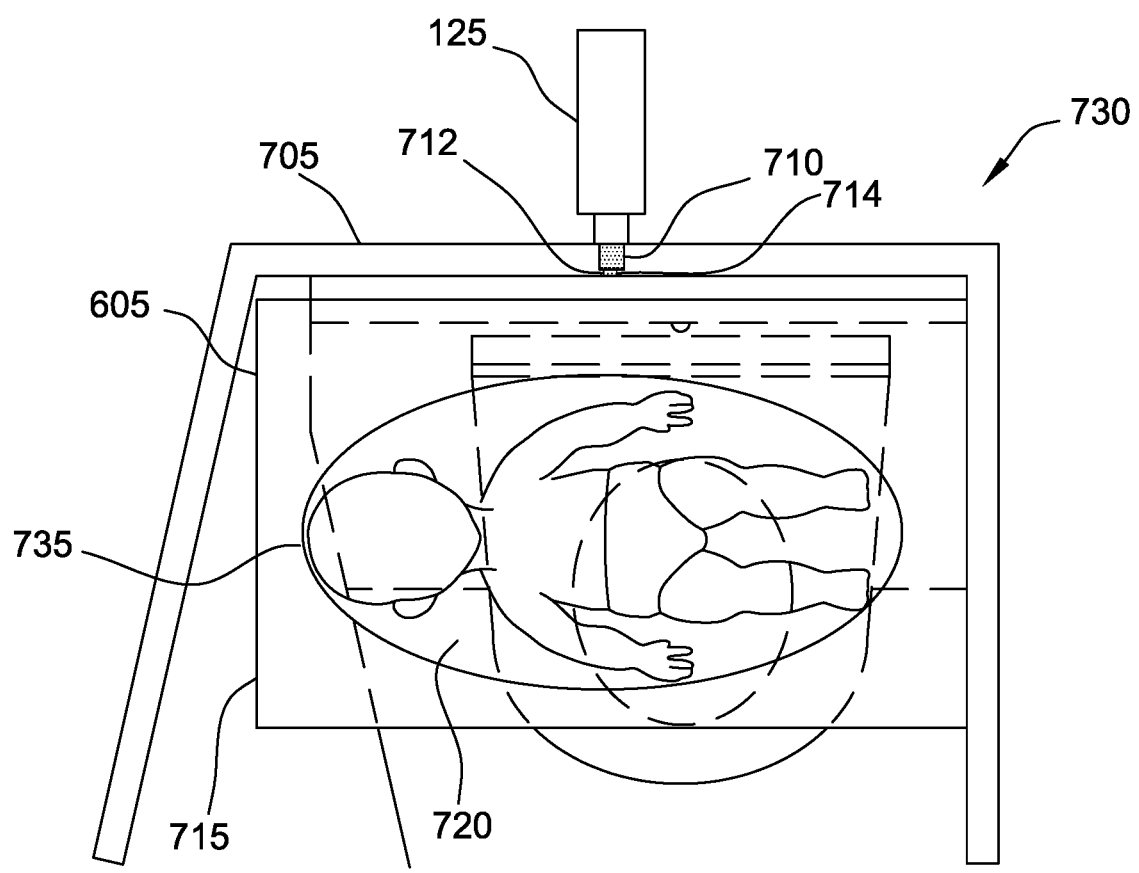

FIGS. 7A-7C illustrate an overhead view 700 of the baby-changing station 605 including a translucent display 105 (shown in FIG. 1) using projector systems 100, 200, and 300 (shown in FIGS. 1, 2, and 3, respectively). In FIG. 7A, view 700 includes a cut-away view of baby-changing station 605 in the stowed or up position. In FIG. 7B, view 725 displays the baby-changing station 605 in the deployed or down position. In FIG. 7C, view 730 displays the baby-changing station 605 in use. The baby-changing station 605 is configured to transition between a stowed position and a deployed position. The baby-changing station 605 includes hinges or other movement mechanics to allow it to transition between the stowed or up position and the deployed or down position.

As shown in view 700, the translucent projection area 720 includes a projection face 115 and a display face 110. The translucent material in the translucent projection area 720 is configured to allow images 130 to be projected onto the projection face 115 and be displayed on the display face 110.

A projector 125 is positioned in wall 705. The projector 125 can be a backlit short-throw projector 125. The projector 125 projects an image 130 through a lens 710 in the wall 705 onto the projection face 115 of the baby-changing station 605. The display face 110 of the baby-changing station 605 is the bottom side of the baby-changing station 605 when deployed or down. The projection face 115 of the baby-changing station 605 is the top side of the baby-changing station 605 when deployed or down.

The lens 710 can be a fish-eye lens or a wide-angle lens to allow the image 130 to be spread out to be displayed on a larger area. The lens 710 would be visible in the wall 705, when the baby-changing station 605 is deployed. The lens 710 can be protected by a shutter 712, such as a camera style shutter. The shutter could be a rotating, guillotine, diaphragm, iris, or other type of mechanism. The shutter 712 closes over the lens 710 when the baby-changing station 605 is deployed or in the down position. The lens 710 can also be protected by an optically transparent cover 714 either on its own or in conjunction with the shutter 712.

The baby-changing station 605, or at least a portion of the baby-changing station 605, is made up a translucent material, such as a material comprising an acrylic polymer and alumina trihydrate (ATH) similar to that of Conan®, created by E.I. duPont de Nemours and Company, Wilmington, Del., (DuPont) which is a solid material. The image 130 traverses through the portion of the baby-changing station 605 that it is projected onto and is displayed on the display face 110 of the baby-changing station 605. The image 130 is then able to be viewed on the display face 110 of the baby-changing station 605. The image 130 is projected in reverse onto the projection face 115 to display in the proper orientation on the display face 110.

As shown in view 700, the projector 125 is positioned perpendicularly to the translucent baby-changing station 605 to allow the image 130 to be transmitted clear and distortion free. The projector 125 can also be positioned at an angle to the translucent baby-changing station 605 and use keystone image correction to account for the angle. This includes moving the projector 125 and lens 710 along the wall to another position based on the available space requirements of the lavatory and/or the wall 705 containing the projector 125 and the lens 710. Furthermore, multiple static image projectors 125 can be used, where the projector controller 135 cycles images between the static image projectors 125 to display an animation or pseudo-animation.

Having the projector 125 positioned behind the wall 705 allows the projector an unobstructed path to project the image 130 onto the translucent baby-changing station 605.

The projector controller 135 instructs the projector 125 on which image 130 to display and when to display the image 130. The projector controller 135 is in communication with one or more sensors 305 (shown in FIG. 3) that inform the projector controller 135 which position the baby-changing station 605 is currently in. The sensor 305 can include, but is not limited to, proximity switch, magnetic switch, level switch, tilt/displacement switch, radial switch, mercury switch, latch sensor, and/or any other potential sensor 305 that informs the projector controller 135 of the current position of the baby-changing station 605. The projector controller 135 can disable projection as soon as it detects that the baby-changing station 605 no longer completely in the stowed position. This can prevent a user from having the projector 125 project light onto their face.

When the baby-changing station 605 is stowed, closed or up, the sensor 305 transmits signals to the projector controller 135 of the current position of the baby-changing station 605. The projector controller 135 can instruct the projector 125 to display one or more images, videos, and/or animations on the translucent display 105 of the baby-changing station 605. When the baby-changing station 605 is opened or deployed, the sensors 305 inform the projector controller 135 of the current position and the projector controller 135 instructs the projector 125 to discontinue projection of the image 130. When the sensors 305 inform the projector controller 135 that the baby-changing station 605 is closed or stowed again, the projector controller 135 instructs the projector 125 to resume projection of the image 130. In some examples, the projector 125 is in direct communication with the sensors 305 to know when to disable projection.

In a first example, the baby-changing station 605 includes a border area 715 and a translucent projection area 720. As shown in view 700 the border area 715 is thicker than the translucent projection area 720, where the translucent projection area 720 is recessed in relation to the surrounding border area 715. The border area 715 being positioned around the translucent projection area 720 provides an area to safely place and cradle a baby 735 to limit the possibility of the baby 735, and any other objects in the translucent projection area 720, such as changing supplies, from rolling off of the baby-changing station 605. The translucent projection area 720 is the area where the baby 735 is placed when the baby-changing station 605 is down or deployed.

In some examples, the translucent projection area 720 is made of a different material as the border area 715. In other examples, baby-changing station 605 can include a translucent material of a single thickness where the area to place the baby 735 is not recessed or where the area to place the baby 735 is molded to be recessed. The baby-changing station 605 can include one or more portions made of a translucent material that allows projections to pass through and include one or more portions made of a different opaque material.

The baby-changing station 605 can be manufactured out of a single translucent material. The baby-changing station 605 can also be manufactured from multiple different materials that are joined together, such as with a color matching adhesive. The translucent projection area 720 of the baby-changing station 605 can be created by thinning out a localized area via one or more of machining, chemical etching, thermal forming, molding, composite materials, and/or as an assembly of multiple parts.

The projector 125 can activate when the projector controller 135 (shown in FIG. 1) receives a signal from one or more triggering devices 420 (shown in FIG. 4A). For example, when the lavatory is not in use, the projector controller 135 puts the projector 125 into a low power mode. The projector controller 135 can do this after a predetermined period of time since any of the triggering devices 420 in the lavatory have been activated or after a predetermined period of time since one or more specific triggering devices 420 have been activated. For example, the projector controller 135 can instruct the projector 125 to go into a low power mode two minutes (120 seconds) after the door lock has been unlocked.

The projector 125 can go into multiple different power modes. The first power mode is normal power mode, where the projector 125 projects images 130 onto translucent displays 105 at full brightness (which can be a full brightness associated with the projector 125 or a full brightness preference set by a user). In a second power mode, the projector 125 does not project any images 130. In a third power mode, the projector 125 projects images 130 at a lower brightness, such as 25-50% brightness of full brightness. In one situation, the projector controller 135, for example, can put the projector 125 into the second low power mode after the door lock is unlocked and into the first low power mode after a predetermined period of time (aka two minutes). The projector controller 135 can instruct the projector 125 to transition from the first low power mode to the second low power mode when a triggering device 420 activates, such as the door of the lavatory opens. The projector controller 135 can then instruct the projector 125 to go into a normal projection mode when a signal is received from a sensor 305 indicating that the door is locked.

While the baby-changing station 605 shown in FIGS. 7A-7C is oriented in a horizontal orientation, the baby-changing station 605 can also be in a vertical orientation, such that when deployed the baby 735 would lie perpendicular to the wall 705 rather than parallel to the wall 705.

Figure 8A:
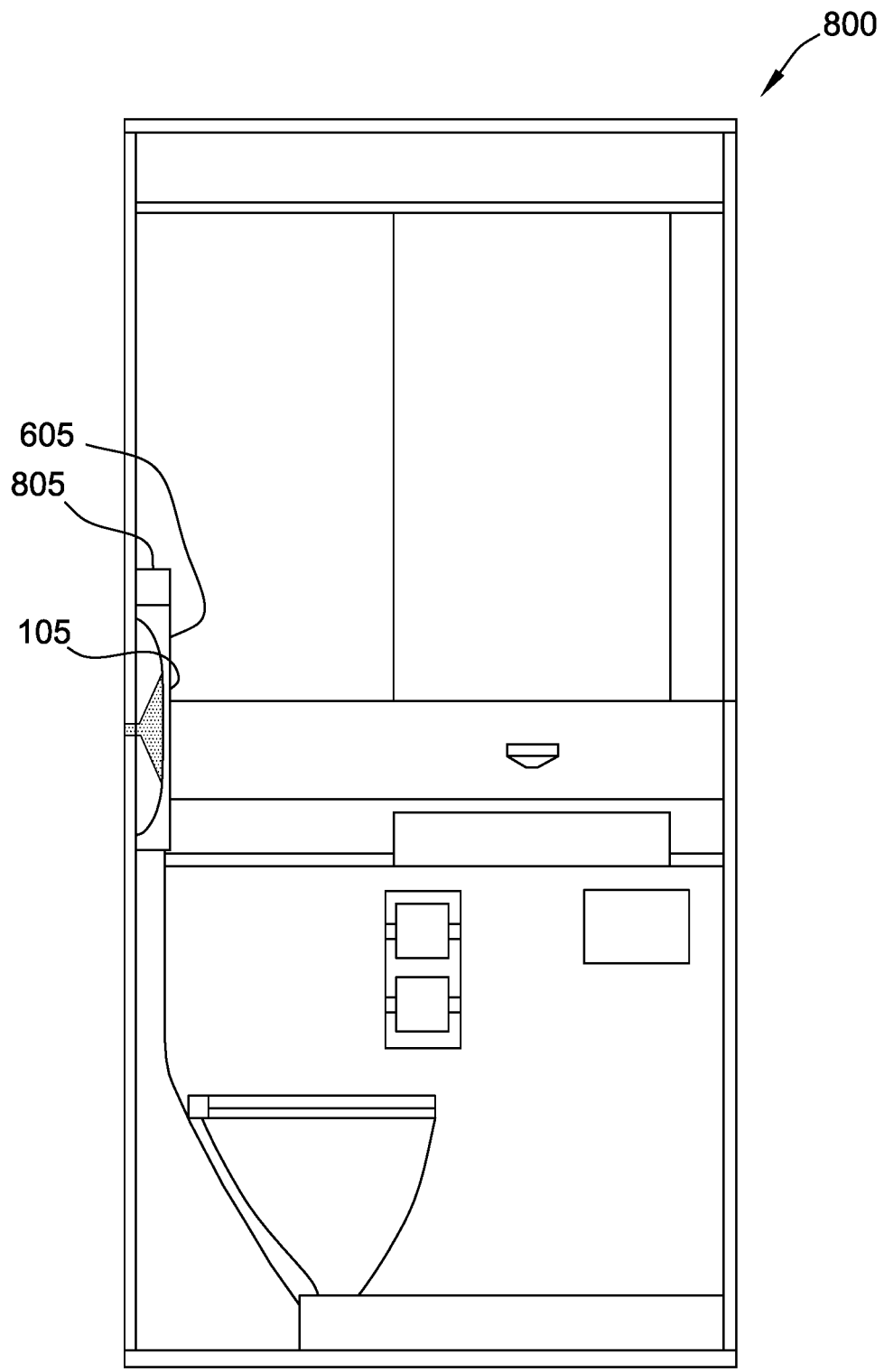
FIGS. 8A and 8B illustrate a side view of the baby-changing station including a translucent display using the projector systems shown in FIGS. 1, 2, and 3.
Figure 8B:
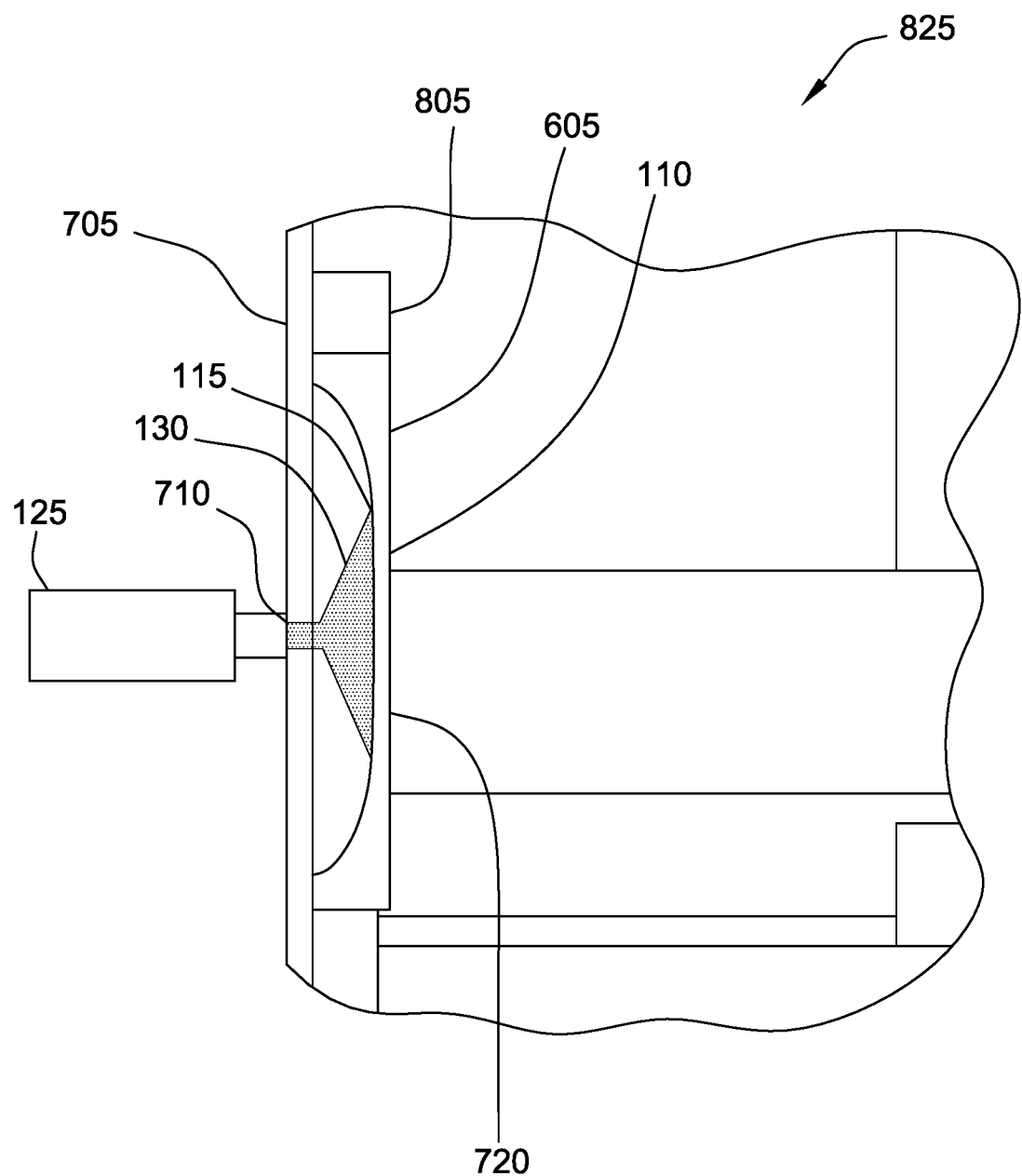

FIGS. 8A and 8B illustrate a side view 800 of the baby-changing station 605 including a translucent display 105 (shown in FIG. 1) using projector systems 100, 200, and 300 (shown in FIGS. 1, 2, and 3, respectively). In FIG. 8A, view 800 includes a cut-away view of baby-changing station 605 in the stowed or up position. In FIG. 8B, view 825 displays a zoom-in view of the baby-changing station 605 in the stowed or up position. View 800 includes a latch mechanism 805 for securing the baby-changing station 605 in the stowed or up position. The latch mechanism 805 can include one or more sensors 305 (shown in FIG. 3) to indicate the current status of the latch mechanism 805.

When the baby-changing station 605 is in the stowed or up position, the projector 125 transmits one or more images 130 through a lens 710 in the wall 705. The image 130 is projected onto a projection face 115 of the translucent projection area 720 of the baby-changing station 605. The image 130 is then displayed on the display face 110 of the translucent projection area 720 of the baby-changing station 605.

Figure 9A:
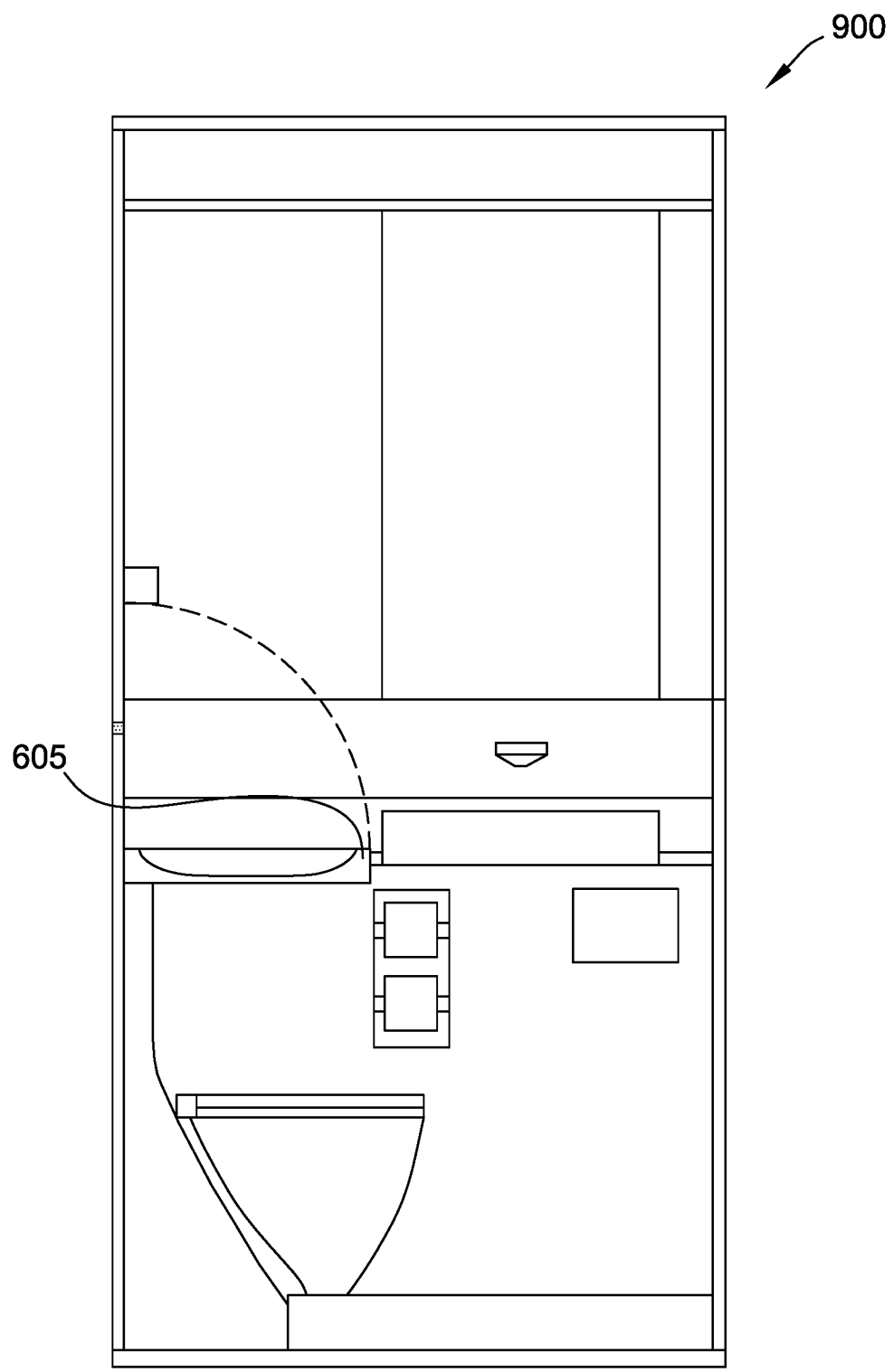
FIGS. 9A and 9B illustrate a side view of the baby-changing station including a translucent display using the projector systems shown in FIGS. 1, 2, and 3.
Figure 9B:
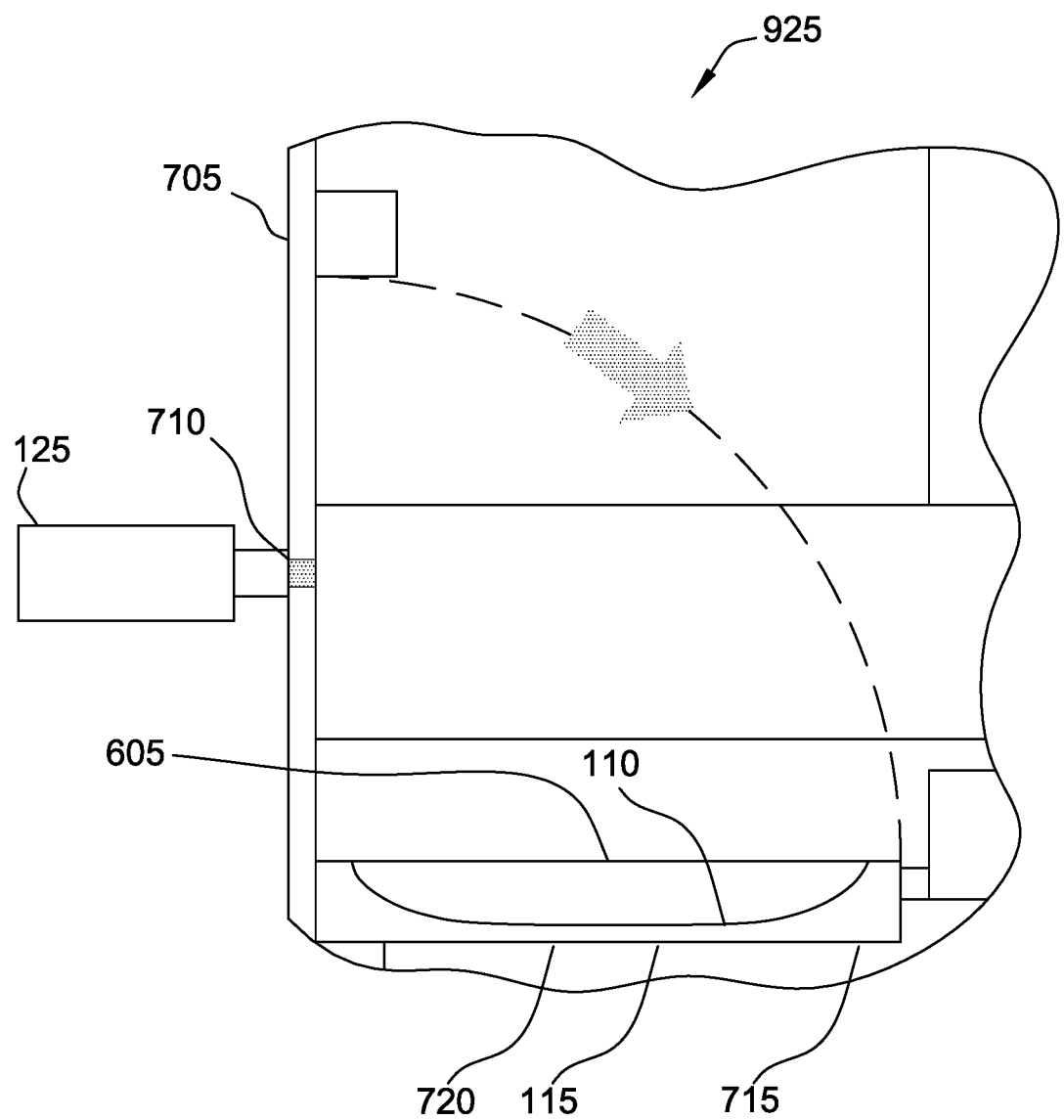

FIGS. 9A and 9B illustrate a side view 900 of the baby-changing station 605 including a translucent display 105 (shown in FIG. 1) using projector systems 100, 200, and 300 (shown in FIGS. 1, 2, and 3, respectively). In FIG. 9A, view 900 includes a cut-away view of baby-changing station 605 in the deployed or down position. In FIG. 9B, view 925 displays a zoom-in view of the baby-changing station 605 in the deployed or down position.

When the baby-changing station 605 is in the deployed or down position, the projector 125 does not transmit images 130 (not shown). The lens 710 is visible in the wall 705, but the projector 125 is out of view and reach of the user of the baby-changing station 605 as the projector is behind the wall 705.

Figure 10A:
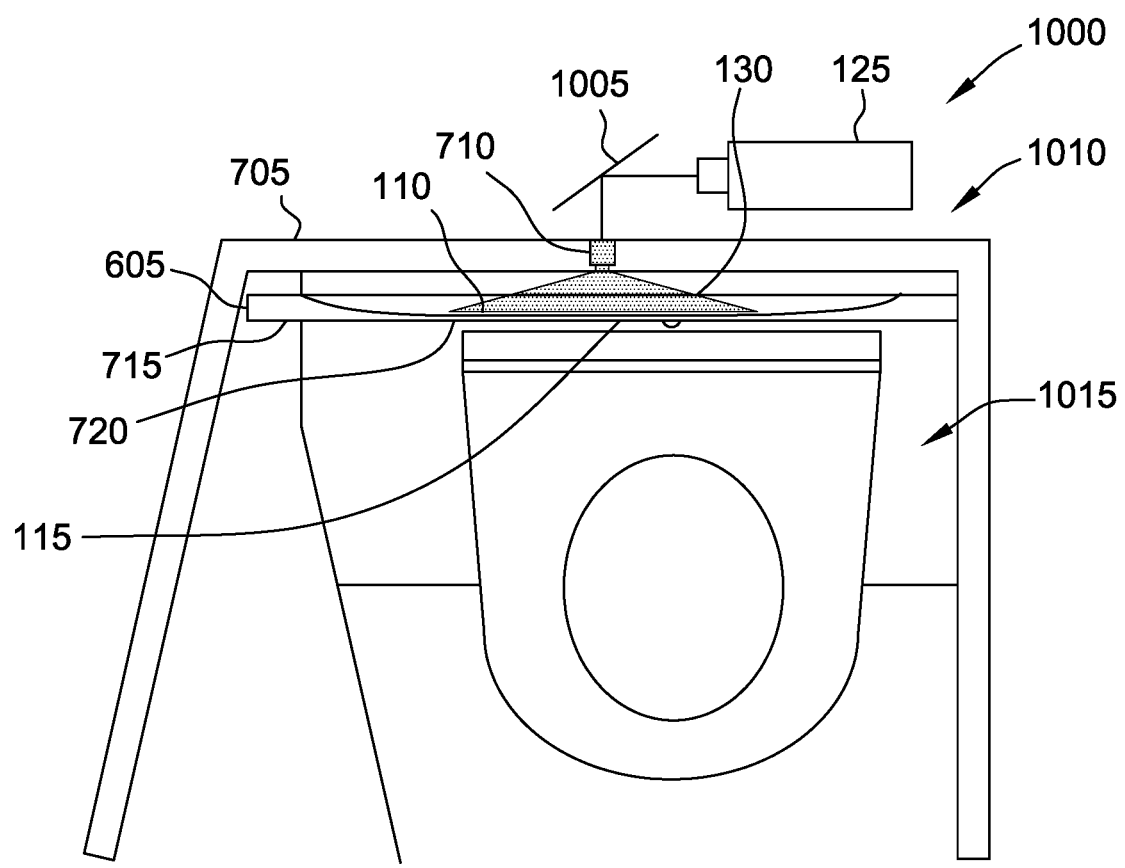
FIG. 10A illustrates an overhead view of another configuration of a translucent display on a baby-changing station.
Figure 10B:
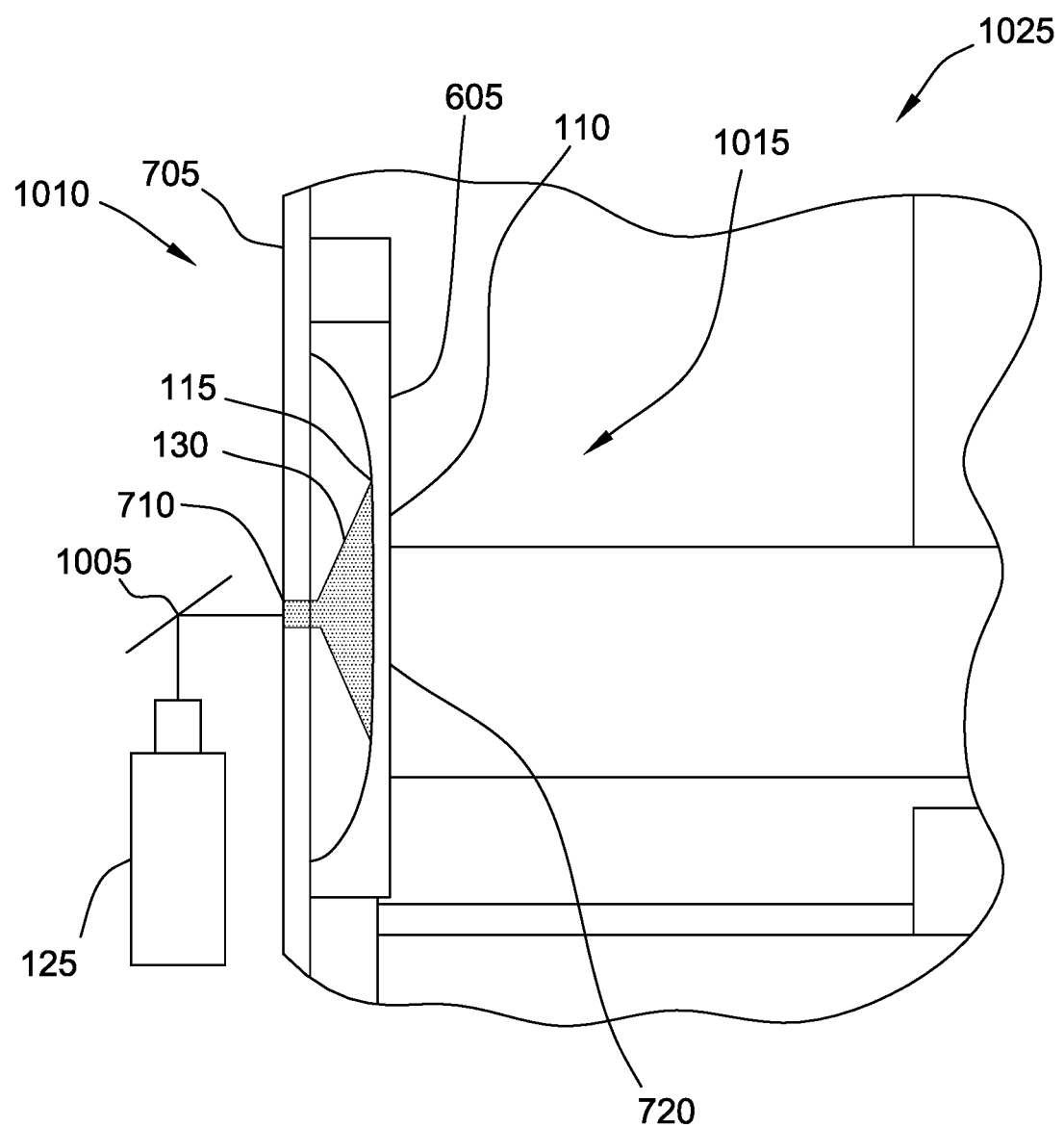
FIG. 10B illustrates a side view of the other configuration of a translucent display on a baby-changing station.

FIG. 10A illustrates an overhead view 1000 of another configuration of a translucent display 105 (shown in FIG. 1) on a baby-changing station 605. FIG. 10B illustrates a side view 1025 of the other configuration of a translucent display 105 (shown in FIG. 1) on a baby-changing station 605.

Depending on the projector 125 used and/or the length of time that the projector 125 is in continuous use, the lens 710 can increase in temperature to a point where the lens 710 can harm an individual who touches it. Furthermore, in many situations the amount of space available for the lavatory is limited. Accordingly, it can be necessary to move or rearrange the configuration of parts of the translucent display 105 to address these issues.

As shown in views 1000 and 1025, the projector 125 is positioned parallel to the wall 705. The projector 125 projects the image 130 onto a mirror 1005, where the mirror 1005 is positioned on the projector side 1010 of the wall 705. The mirror 1005 is mounted using one or more fastening devices, such as brackets. The mirror 1005 is secured in a fixed position to prevent movement of the mirror 1005 and prevent the image 130 from becoming distorted. The mirror 1005 directs the image 130 through the lens 710 and onto the projection face 115 of the translucent projection area 720 of the baby-changing station 605, which is on the display side 1015 of the wall 705. While the mirror is shown at a 45 degree angle and the projector 125 is shown as parallel to the wall 705, both of these angles can change based on the required configuration. Furthermore, the projector 125 can be positioned above, below, or to the side of the lens 710 depending on the available space and required configuration.

Figure 11:
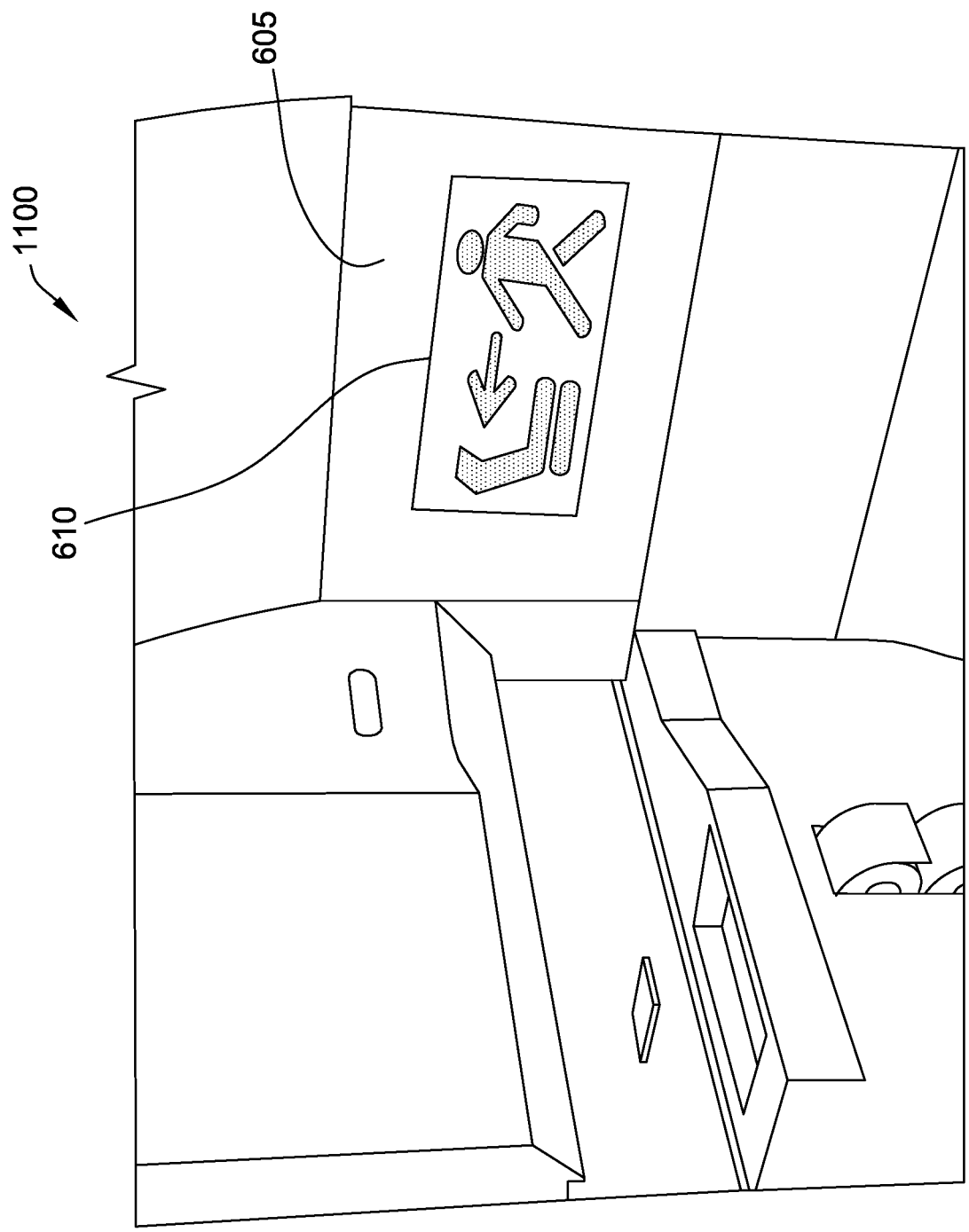
FIG. 11 illustrates a view of a translucent display on a baby-changing station using the projector systems shown in FIGS. 1, 2, and 3.

FIG. 11 illustrates a view 1100 of a translucent display 105 (shown in FIG. 1) on a baby-changing station 605 using projector systems 100, 200, and 300 (shown in FIGS. 1, 2, and 3, respectively). View 1100 shows the display face 110 (shown in FIG. 1) of the translucent display 105 on the baby-changing station 605 in the stowed or up position. The display face 110 is displaying an image 130 (shown in FIG. 1) instructing the viewer 120 (shown in FIG. 1) to return to their seat, such as in an aircraft lavatory.

Figure 12:
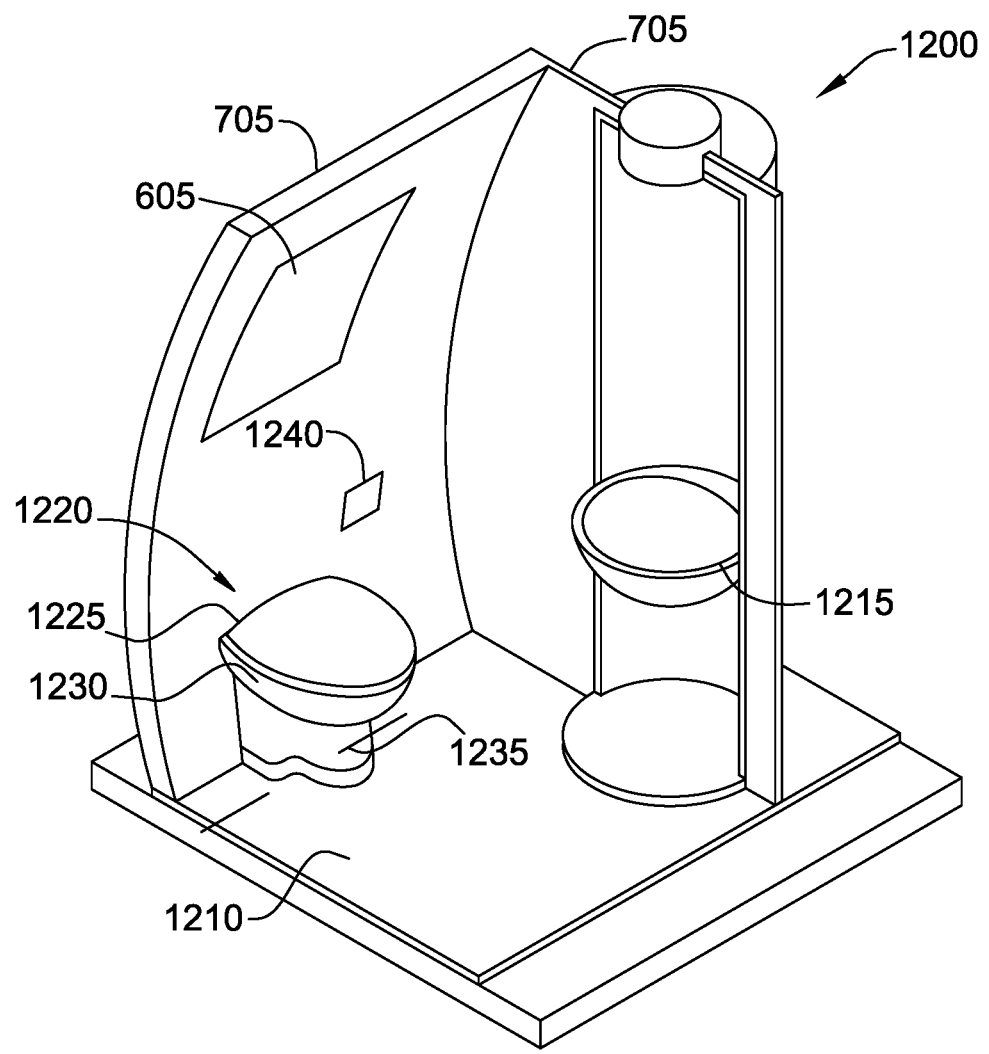
FIG. 12 illustrates a further view of a lavatory using the projector systems shown in FIGS. 1, 2, and 3.

FIG. 12 illustrates a further view of a lavatory 1200 using the projector systems 100, 200, and 300 (shown in FIGS. 1, 2, and 3, respectively). Lavatory 1200 includes a plurality of walls 705 and a floor 1210. Walls 705 and floor 1210 can include projector systems 300. Lavatory 1200 also includes a sink 1215 and a toilet 1220. The sink 1215 can be similar to sink area 410 (shown in FIG. 4). The toilet 1220 includes a toilet lid 1225, a toilet seat 1230, and a toilet shroud 1235. The toilet 1220 is associated with a toilet flush button 1240. The lavatory 1200 also includes a fold-down baby-changing station 605.

Figure 13:
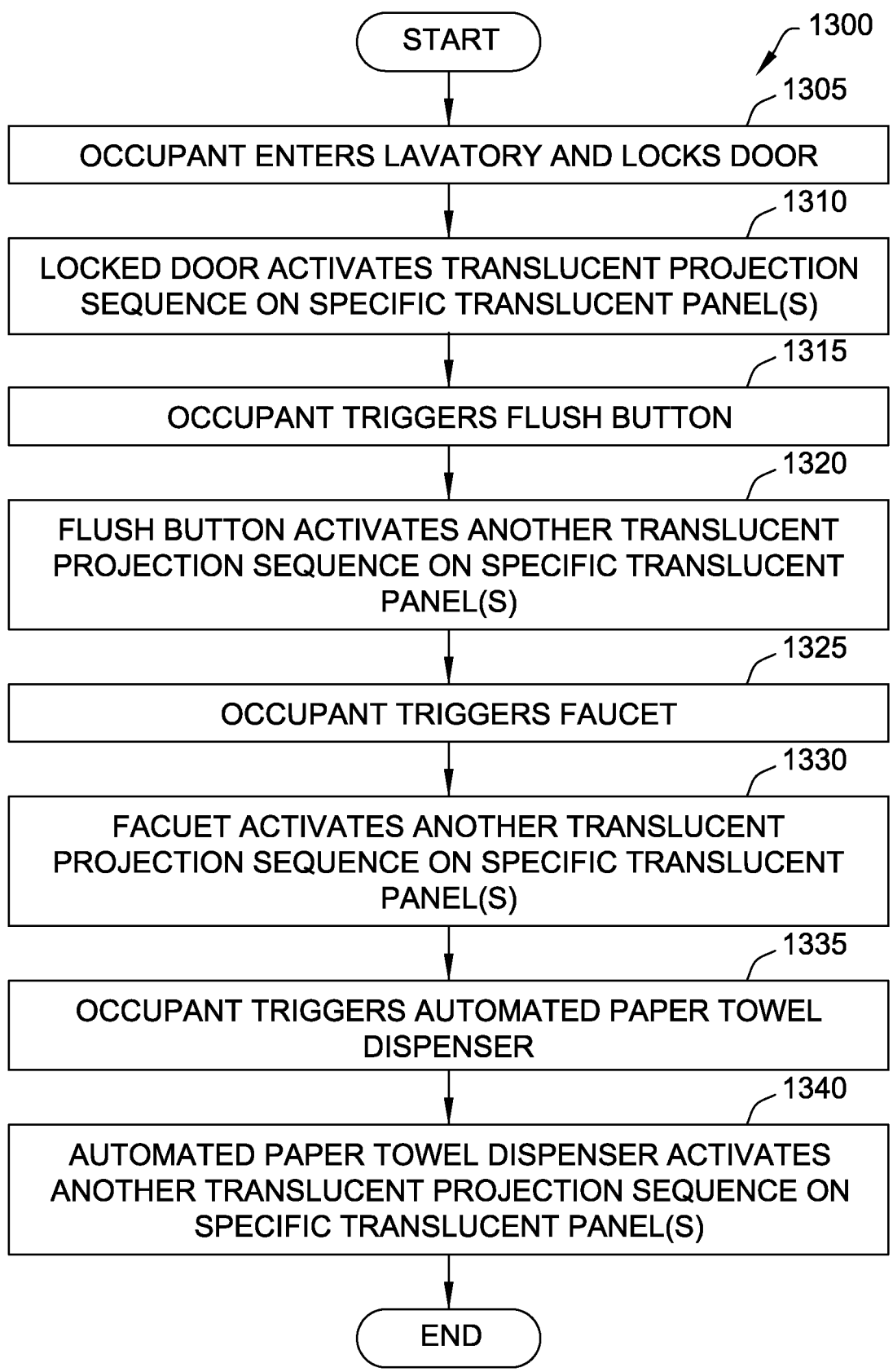
FIG. 13 illustrates a process for using the lavatory-based projector system in accordance with at least one example.

FIG. 13 illustrates a process 1300 for using the lavatory-based projector system in accordance with at least one example. In the example, process 1300 is implemented by at least one of a projector controller 135 (shown in FIG. 1) and a projector controller computer device 310 (shown in FIG. 3) programmed to control a lavatory 1200 (shown in FIG. 12) with a plurality of translucent displays 105 (shown in FIG. 1). In the example, the lavatory 1200 can have translucent displays 105 positioned in surfaces, such as, but not limited to, the countertops 405, the sink area 410, the splash back area 415 (all shown in FIG. 4A), the baby-changing station 605 (shown in FIG. 6), a wall 705 (shown in FIG. 12), or other surface, including but not limited to the toilet 1220, the toilet lid 1225, the toilet seat 1230, the toilet shroud 1235, the walls 705, the floor 1210 (all shown in FIG. 12), the ceiling, the cabinet faces, and any other visible surface in the lavatory 1200. While process 1300 describes the use of a projector system 100, 200, and 300 (shown in FIGS. 1, 2, and 3, respectively) in a lavatory setting, the systems and methods described herein can also be used in vehicles, such as, but not limited to aircraft, watercraft, trains, buses, and spacecraft, and on other surfaces in the vehicle, such as, but not limited to, at passenger seats (e.g., tray tables), in galleys (e.g., work decks and sinks), passenger entryways (e.g., ceilings, floors, and walls), bar units (e.g., the countertops and fronts), and any other visible surface of the vehicle. Furthermore, these systems and methods would also be applicable to other environments, such as, but not limited to, bathrooms in homes and businesses (or hotels), kitchens, dining rooms, and other public areas of homes, businesses, or hotels. While a baby-changing station is used as an example implementation herein, after reading this specification it will be recognized other implementations and applications are within the scope of the present disclosure, including but not limited to other stowable support surfaces such as trays, tables, workstations, among others.

In process 1300, an occupant enters the lavatory 1200 and locks 1305 the door. The locking 1305 of the door triggers a first triggering device 420 (shown in FIG. 4A) which causes the projector controller 135 to activate 1310 a first projection sequence on specific translucent displays 105, such as, but not limited to, the wall 705, ceiling, floor 1210, baby-changing station 605, and cabinet faces. A projection sequence is an image, a plurality of images, and/or a video to be displayed on one or more translucent displays 105. As used herein, the first projection sequence, the second projection sequence, and the third projection sequence indicate differing sequences of images or video. Furthermore the different sequences can be projected on the same translucent displays 105 or different translucent displays 105. In some examples, the first projection sequence ends and continues to display an image, such as the last image of the first projection sequence. In other examples, the first projection sequence repeats until interrupted by a specific user action. The projector controller 135 receives a signal from the door lock that the door has been locked 1305, from a motion sensor, or any other sensor 305 (shown in FIG. 3) that indicates that projector controller 135 should activate the first display sequence and the projector controller 135 instructs one or more projectors 125 (shown in FIG. 1) to display the first projection sequence.

The user triggering 1315 the toilet flush button 1240 (shown in FIG. 12) activates 1320 the second projection sequence. The second projection sequence can be different from the first projection sequence in content of the projection sequence and/or location of the translucent displays 105 that the second projection sequence is displayed on. The second projection sequence can be displayed on one or more of the baby-changing station 605, the toilet 1220, the toilet lid 1225, the toilet seat 1230, and the toilet shroud 1235. The second projection sequence can be projected on the same surfaces as the first projection sequence. The second projection sequence can be activated 1320 after the toilet flush button 1240 is triggered 1315 and the toilet lid 1225 and/or the toilet seat 1230 is returned to the down position. The projector controller 135 receives a signal that the toilet flush button 1240 has been triggered 1315 and the projector controller 135 instructs one or more projectors 125 to display the second projection sequence. The flush sensor 305 can be separate from the toilet flush button 1240 and the flush sensor 305 detects when a flush occurs, such as in the case of an automatically flushing toilet. The second projection sequence can be displayed on any combination of the above listed transparent displays 105 in response to one or more of the triggers discussed above.

When the user triggers 1325 the faucet, such as by triggering 1325 the faucet sensor or triggering device 420 (shown in FIG. 4A), the third projection sequence is activated 1330. The third projection sequence can be displayed on one or more of the countertops 405, the sink area 410, and the splash back area 415. The third projection sequence can also be projected on the same surfaces as the at least one of the first projection sequence and the second projection sequence. The projector controller 135 receives a signal that the faucet sensor or triggering device 420 has been triggered 1325 and the projector controller 135 instructs one or more projectors 125 to display the third projection sequence. Similar to the second projection sequence, the third projection sequence can be displayed on any combination of the above listed transparent displays 105 in response to one or more of the triggers discussed above.

When the user triggers 1335 an automated paper towel dispenser, the fourth projection sequence is activated 1340. The fourth projection sequence can be displayed on one or more of the countertops 405, the sink area 410, and the splash back area 415. The fourth projection sequence can be projected on the same surfaces as the at least one of the first projection sequence, the second projection sequence, and the third projection sequence. The projector controller 135 receives a signal that the automated paper towel dispenser has been triggered 1335 and the projector controller 135 instructs one or more projectors 125 to display the fourth projection sequence. The fourth projection sequence can be displayed on any combination of the above listed transparent displays 105 in response to one or more of the triggers discussed above.

The different sequences can be triggered in a different order based on the user's actions. Furthermore, one or more of the sequences can be triggered based on additional sensors 305 present in the lavatory 1200, which can trigger other projection sequences.

The projector controller 135 can continue to display one or more sequences until the user disengages the door lock. The projector controller 135 can continue displaying one or more sequences for a predetermined period of time after the door is unlocked.

The projector controller 135 can also continuously display one or more images or video in a low-powered state, where the images are projected at a lower light level until the door lock is engaged.

The projector controller 135 can also interrupt any of the projection sequences to display an important message, such as the return to seat images in shown FIGS. 5 and 11, or other pertinent information or indication, for example, provide visual indication that an occupant within the lavatory has pushed the attendant call button, the translucent display 105 might show an image/message that the attendant has been called.

Figure 14:
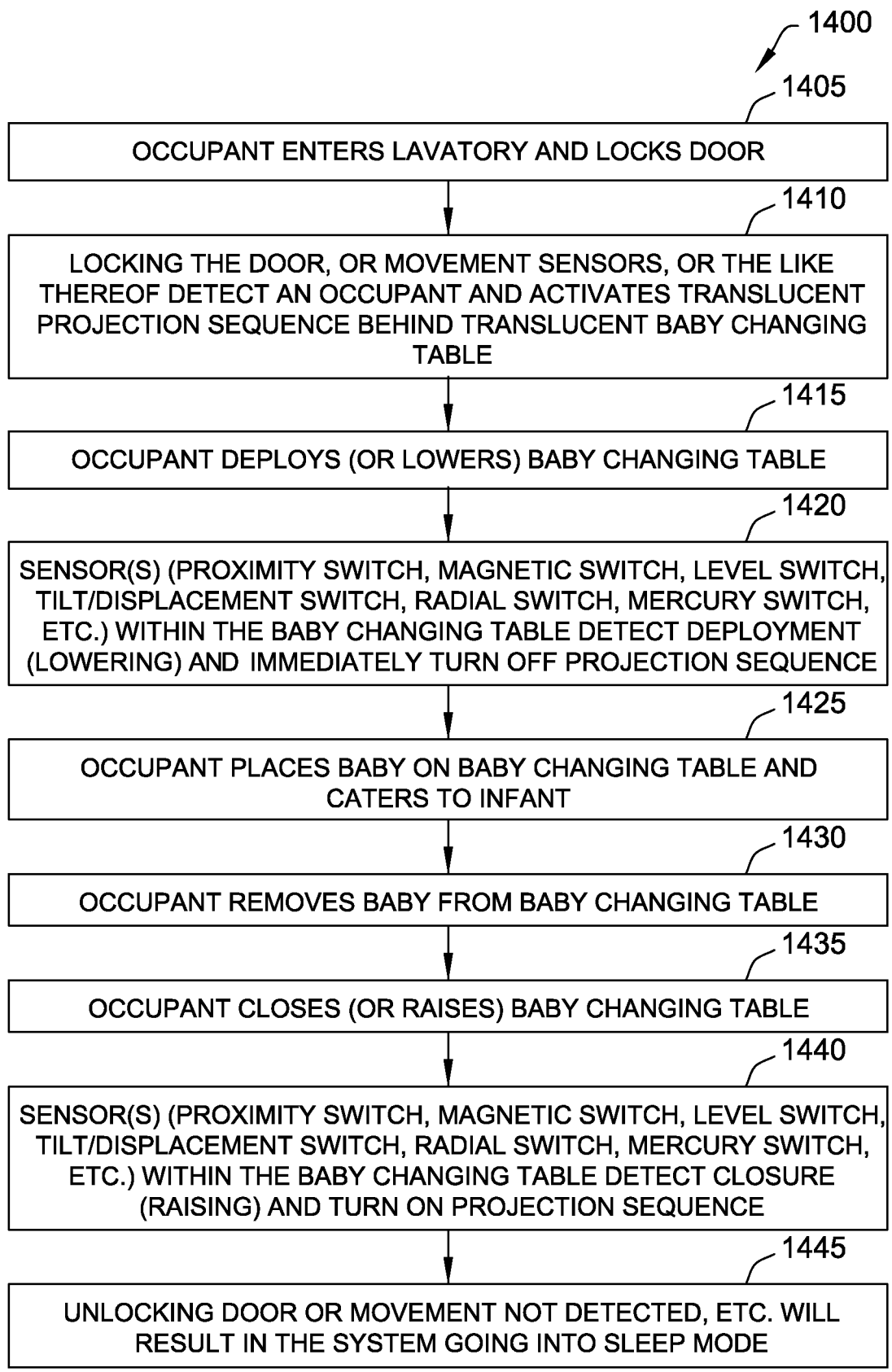
FIG. 14 illustrates a process for using the lavatory-based projector system with a baby-changing station in accordance with at least one example.

FIG. 14 illustrates a process 1400 for using the lavatory-based projector system with a baby-changing station 605 (shown in FIG. 6) in accordance with at least one example. Process 1400 is implemented by at least one of a projector controller 135 (shown in FIG. 1) and a projector controller computer device 310 (shown in FIG. 3) programmed to control a lavatory 1200 (shown in FIG. 12) with a plurality of translucent displays 105 (shown in FIG. 1). The lavatory 1200 has a translucent displays 105 positioned in the baby-changing station 605. The lavatory 1200 can have translucent display 105 in other surfaces, such as, but not limited to, the countertops 405, the sink area 410, the splash back area 415 (all shown in FIG. 4A), a wall 705 (shown in FIG. 7), or other surface, including but not limited to the toilet 1220, the toilet lid 1225, the toilet seat 1230, the toilet shroud 1235, the walls 1205, the floor 1210 (all shown in FIG. 12), the ceiling, the cabinet faces, and any other visible surface in the lavatory 1200. While process 1400 describes the use of a projector system 100, 200, and 300 (shown in FIGS. 1, 2, and 3, respectively) in a lavatory setting, the systems and methods described herein can also be used in vehicles, such as, but not limited to aircraft, watercraft, trains, buses, and spacecraft.

Process 1400 is a variation on process 1300 (shown in FIG. 13). In process 1300, an occupant enters the lavatory 1200 and locks 1305 the door. The locking 1305 of the door triggers a first triggering device 420 (shown in FIG. 4A) which causes the projector controller 135 to activate 1310 a first projection sequence on specific translucent displays 105, such as, but not limited to, the wall 705, ceiling, floor 1210, baby-changing station 605, and cabinet faces. A projection sequence is an image, a plurality of images, and/or a video to be displayed on one or more translucent displays 105. As used herein, the first projection sequence, the second projection sequence, and the third projection sequence indicate differing sequences of images or video. Furthermore the different sequences can be projected on the same translucent displays 105 or different translucent displays 105. The first projection sequence can end and continue to display an image, such as the last image of the first projection sequence. The first projection sequence can repeat until interrupted by a specific user action. The projector controller 135 receives a signal from the door lock that the door has been locked 1305, from a motion sensor, or any other sensor 305 (shown in FIG. 3) that indicates that projector controller 135 should activate the first display sequence and the projector controller 135 instructs one or more projectors 125 (shown in FIG. 1) to display the first projection sequence In process 1400, an occupant enters the lavatory 1200 and locks 1405 the door. The locking 1405 of the door triggers a first triggering device 420 (shown in FIG. 4A) which causes the projector controller 135 to activate 1410 a first projection sequence on specific translucent displays 105, such as, but not limited to, the wall 705, ceiling, floor 1210, baby-changing station 605, and cabinet faces. A projection sequence is an image, a plurality of images, and/or a video to be displayed on one or more translucent displays 105. As used herein, the first projection sequence, the second projection sequence, and the third projection sequence indicate differing sequences of images or video. Furthermore the different sequences can be projected on the same translucent displays 105 or different translucent displays 105. The first projection sequence can end and continue to display an image, such as the last image of the first projection sequence. The first projection sequence can repeat until interrupted by a specific user action. The projector controller 135 receives a signal from the door lock that the door has been locked 1405, from a motion sensor, or any other sensor 305 (shown in FIG. 3) that indicates that projector controller 135 should activate the first display sequence and the projector controller 135 instructs one or more projectors 125 (shown in FIG. 1) to display the first projection sequence. The projector controller 135 can also interrupt any of the projection sequences to display an important message, such as the return to seat images in shown FIGS. 5 and 11, or other pertinent information or indication, for example, provide visual indication that an occupant within the lavatory has pushed the attendant call button, the translucent display 105 might show an image/message that the attendant has been called.

The projector 125 associated with the baby-changing station 605 is currently projecting one or more images 130 onto the baby-changing station 605. The occupant deploys or lowers 1415 the baby-changing station 605. One or more sensors 305 associated with the baby-changing station 605 transmit 1420 to the projector controller 135 that the baby-changing station 605 is no longer fully in the stowed or up position. The projector controller 135 instructs the projector 125 associated with the baby-changing station 605 to stop projecting images. The projector controller 135 instructs the projector 125 to stop projecting as soon as it determines that the baby-changing station 605 is no longer fully in the stowed or up position, so that the projector 125 stops projecting before the baby-changing station 605 is fully in the down position. This timing reduces the likelihood that the projector will project into the eyes and/or face of the occupant. The sensors 305 associated with the baby-changing station 605 includes, but are not limited to, proximity switch, magnetic switch, level switch, tilt/displacement switch, radial switch, mercury switch, latch switch, or any other switch or sensor that indicates the current position of the baby-changing station 605.

While the baby-changing station 605 is in the deployed or down position, the occupant can place 1425 the baby on the baby-changing station 605 and caters to the needs of the baby. The occupant removes 1430 the baby from the baby-changing station 605 and closes or raises 1435 the baby-changing station 605 back to the stowed or up position. The sensors 305 associated with the baby-changing station 605 inform 1440 the projector controller 135 that the baby-changing station 605 is back in the stowed or up position.

The projector controller 135 instructs the projector 125 associated with the baby-changing station 605 to resume the projection sequence that it was projecting, such as the first projection sequence. The projector 125 can resume the projection sequence at the point that the sequence was stopped. The projector controller 135 can also synchronize the projector 125 associated with the baby-changing station 605 to be synchronized with the other translucent displays 105. For example, while the projector 125 associated with the baby-changing station 605 stopped projecting the first projection sequence; the other active projectors 125 in the lavatory 1200 continued projecting the first projection sequence. When the baby-changing station 605 is back in the stowed or up position, the projector controller 135 instructs the projector 125 associated with the baby-changing station 605 to start projecting the first projection sequence at the same point in the sequence that the other projectors 125 currently are.

When the projector controller 135 determines 1445 that the door has been unlocked, or that the movement has not been detected for a predetermined period of time, the projector controller 135 can instruct the projectors 125 to go into a sleep mode. When in the sleep mode the projectors 125 can stop the projecting images 130. When in the sleep mode, the projectors 125 can also continue to project images 130, but at a lower brightness (25-50% of full brightness).

Figure 15:
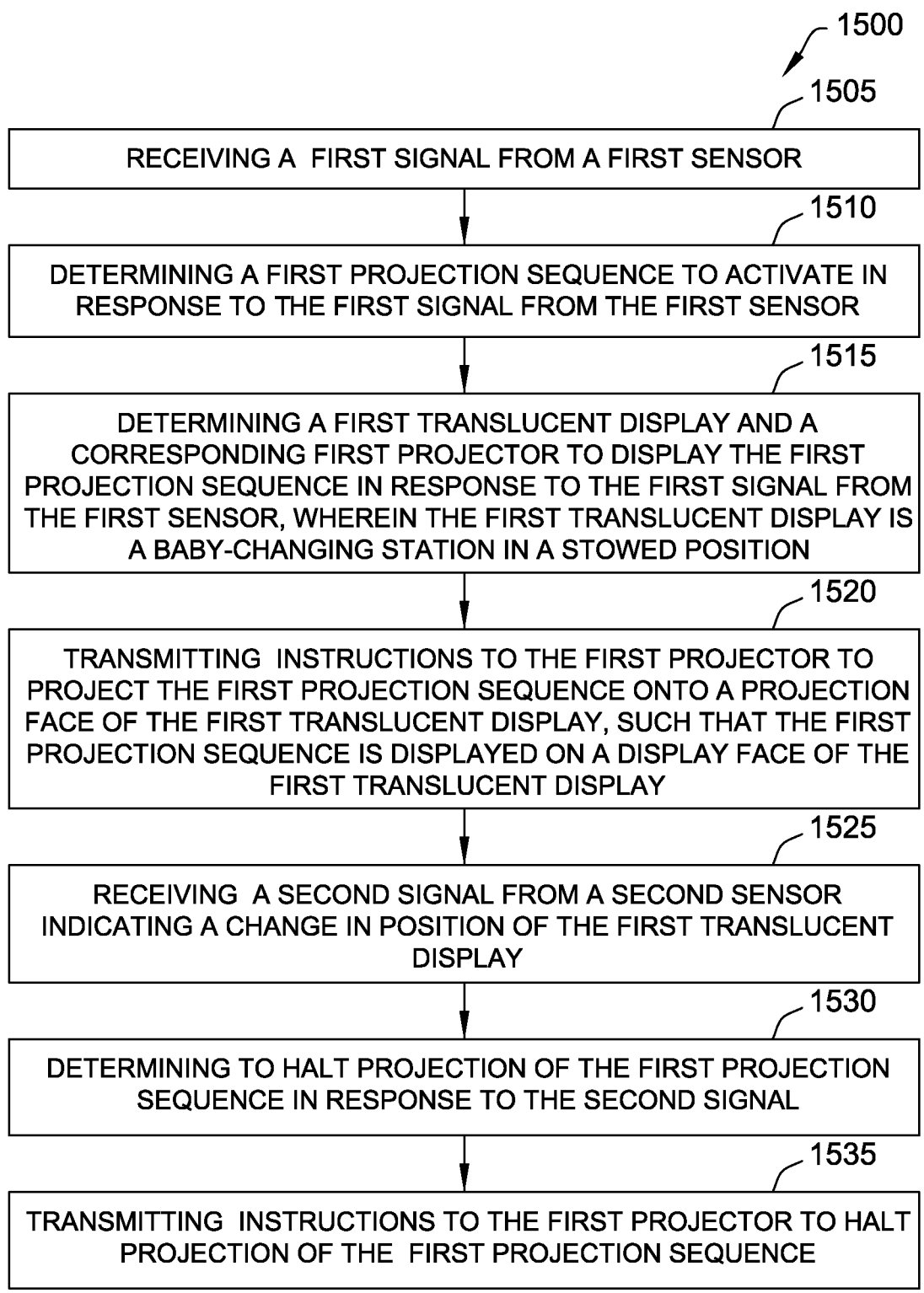
FIG. 15 illustrates another process for using the lavatory-based projector system with a baby-changing station in accordance with at least one example

FIG. 15 illustrates another process 1500 for using the lavatory-based projector system with a baby-changing station 605 (shown in FIG. 6) in accordance with at least one example. Process 1500 is implemented by at least one of a projector controller 135 (shown in FIG. 1) and a projector controller computer device 310 (shown in FIG. 3) programmed to control a lavatory 1200 (shown in FIG. 12) with a plurality of translucent displays 105 (shown in FIG. 1). The lavatory 1200 has a translucent displays 105 positioned in the baby-changing station 605. The lavatory 1200 can have translucent display 105 in other surfaces, such as, but not limited to, the countertops 405, the sink area 410, the splash back area 415 (all shown in FIG. 4A), a wall 705 (shown in FIG. 7), or other surface, including but not limited to the toilet 1220, the toilet lid 1225, the toilet seat 1230, the toilet shroud 1235, the walls 1205, the floor 1210 (all shown in FIG. 12), the ceiling, the cabinet faces, and any other visible surface in the lavatory 1200. While process 1500 describes the use of a projector system 100, 200, and 300 (shown in FIGS. 1, 2, and 3, respectively) in a lavatory setting, the systems and methods described herein can also be used in vehicles, such as, but not limited to aircraft, watercraft, trains, buses, and spacecraft.

In process 1500, the projector controller computer device 310 receives 1505 a first signal from a first sensor 305 (shown in FIG. 3). The first sensor 305 can include any sensor 305, such as, but not limited to, a door lock sensor, a flush sensor, a faucet sensor, a motion sensor, a thermal sensor, and an automatic paper towel dispenser sensor. The projector controller computer device 310 determines 1510 a first projection sequence to display in response to the first signal from the first sensor 305. A projection sequence is an image, a series of images, and/or a video to be displayed on one or more translucent displays 105. The projector controller computer device 310 determines 1515 a first translucent display 105 (shown in FIG. 1) and a corresponding first projector 125 (shown in FIG. 1) to display the first projection sequence. The first translucent display is the baby-changing station 605. The projector controller computer device 310 transmits instructions 1520 to the first projector 125 to project the first projection sequence on a projection face 115 (shown in FIG. 1) of the baby-changing station 605. Such that the first projection sequence is displayed on a display face 110 (shown in FIG. 1) of the baby-changing station 605. The projection face 115 is the opposite side of the first baby-changing station 605 from the display face 110 of the baby-changing station 605. The projector 125 projects the image 130 in reverse onto the projection face 115, so that the image 130 can be displayed in proper orientation on the display face 110 to the viewer 120.

The projector controller computer device 310 receives 1525 a second signal from a second sensor 305. The second sensor 305 is associated with the baby-changing station 605 and indicates a current position of the baby-changing station 605. The second sensors 305 associated with the baby-changing station 605 can include, but are not limited to, proximity switch, magnetic switch, level switch, tilt/displacement switch, radial switch, mercury switch, latch sensor, or any other switch or sensor that indicates the current position of the baby-changing station 605.

The projector controller computer device 310 determines 1530 to halt projection of the first projection sequence in response to the second signal. The second signal can indicate that the baby-changing station 605 is opening or just that the latch holding the baby-changing station 605 in the stowed position has been opened. The projector controller computer device 310 transmits 1535 instructions to the first projector 125 to halt projection of the first projection sequence.

The projector controller computer device 310 receives a third signal from the second sensor indicating that the baby-changing station 605 is in the stowed position. The projector controller computer device 310 transmits instructions to the first projector to resume projection of the first projection sequence.

The projector controller computer device 310 can transmit instructions to the first projector 125 and a second projector 125 associated with a second translucent display 105 to display the first projection sequence on the display face 110 of the first translucent display 105 and the second translucent display 105. The second translucent display 105 is different from the first translucent display 105. The projector controller computer device 310 transmits instructions to the first projector 125 to halt projection of the first projection sequence in response to the second signal while the second projector 125 continues to project the first projection sequence on the second translucent display 105. The projector controller computer device 310 synchronizes the display of the first projection sequence by first projector 125 and the second projector 125, so that both projectors 125 are simultaneously projecting the same images. The second translucent display 105 can include a wall 705, a countertop 405, a ceiling, a floor 1210, a, a cabinet face, a splash back area 415, a sink area 410, a toilet 1220, a toilet shroud 1235, a toilet seat 1230, and a toilet lid 1225.

The projector controller computer device 310 can receive a third signal from the first sensor 305 indicating that a door lock has been unlocked. The projector controller computer device 310 can then instruct the first projector 125 to activate a sleep mode.

The projector controller computer device 310 receives a signal from at least one sensor 305 indicating that the baby-changing station 605 is in the stowed position. The projector controller computer device 310 instructs the projector 125 to project at least one image 130 on the translucent display 105. The projector controller computer device 310 receives a signal from the at least one sensor 305 indicating that the baby-changing station 605 is no longer in the stowed position. The projector controller computer device 310 instructs the projector 125 to halt projection of the at least one image 130. The projector controller computer device 310 receives a signal from the at least one sensor 305 indicating that the baby-changing station 605 is back in the stowed position. The projector controller computer device 310 instructs the projector to resume projection of the at least one image.

Figure 16:
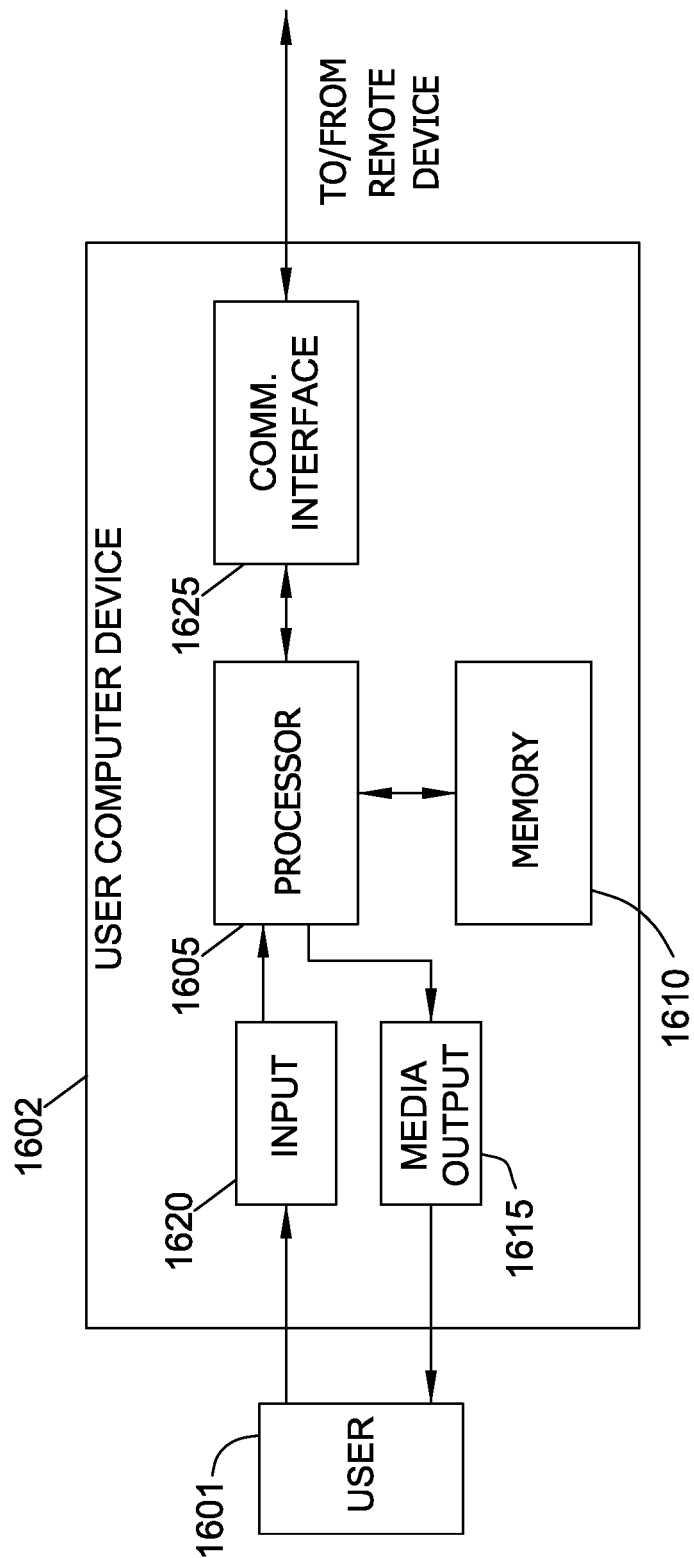
FIG. 16 illustrates an example configuration of user computer device used in the projector system shown in FIG. 3, in accordance with one example of the present disclosure.

FIG. 16 illustrates an example configuration of user computer device 1602 used in the projector system 300 (shown in FIG. 3), in accordance with one example of the present disclosure. User computer device 1602 is operated by a user 1601. The user computer device 1602 can include, but is not limited to, the projector 125 (shown in FIG. 1), the sensor 305, and the client system 325 (both shown in FIG. 3). The user computer device 1602 includes a processor 1605 for executing instructions. In some examples, executable instructions are stored in a memory area 1610. The processor 1605 can include one or more processing units (e.g., in a multi-core configuration). The memory area 1610 is any device allowing information such as executable instructions and/or transaction data to be stored and retrieved. The memory area 1610 can include one or more computer-readable media.

The user computer device 1602 also includes at least one media output component 1615 for presenting information to the user 1601. The media output component 1615 is any component capable of conveying information to the user 1601. In some examples, the media output component 1615 includes an output adapter (not shown) such as a video adapter and/or an audio adapter. An output adapter is operatively coupled to the processor 1605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 1615 is configured to present a graphical user interface (e.g., a web browser and/or a client application) to the user 1601. A graphical user interface can include, for example, an interface for viewing the projection sequences. In some examples, the user computer device 1602 includes an input device 1620 for receiving input from the user 1601. The user 1601 can use the input device 1620 to, without limitation, select a projection sequence. The input device 1620 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 1615 and the input device 1620.

The user computer device 1602 can also include a communication interface 1625, communicatively coupled to a remote device such as the projector controller computer device 310 (shown in FIG. 3), one or more sensors 305, and one or more projectors 125. The communication interface 1625 can include, for example, a wired or wireless network adapter and/or a wireless data transceiver for use with a mobile telecommunications network.

Stored in the memory area 1610 are, for example, computer-readable instructions for providing a user interface to the user 1601 via the media output component 1615 and, optionally, receiving and processing input from the input device 1620. A user interface can include, among other possibilities, a web browser and/or a client application. Web browsers enable users, such as the user 1601, to display and interact with media and other information typically embedded on a web page or a website from the projector controller computer device 310. A client application allows the user 1601 to interact with, for example, the projector controller computer device 310. For example, instructions can be stored by a cloud service, and the output of the execution of the instructions sent to the media output component 1615.

The processor 1605 executes computer-executable instructions for implementing aspects of the disclosure.

Figure 17:
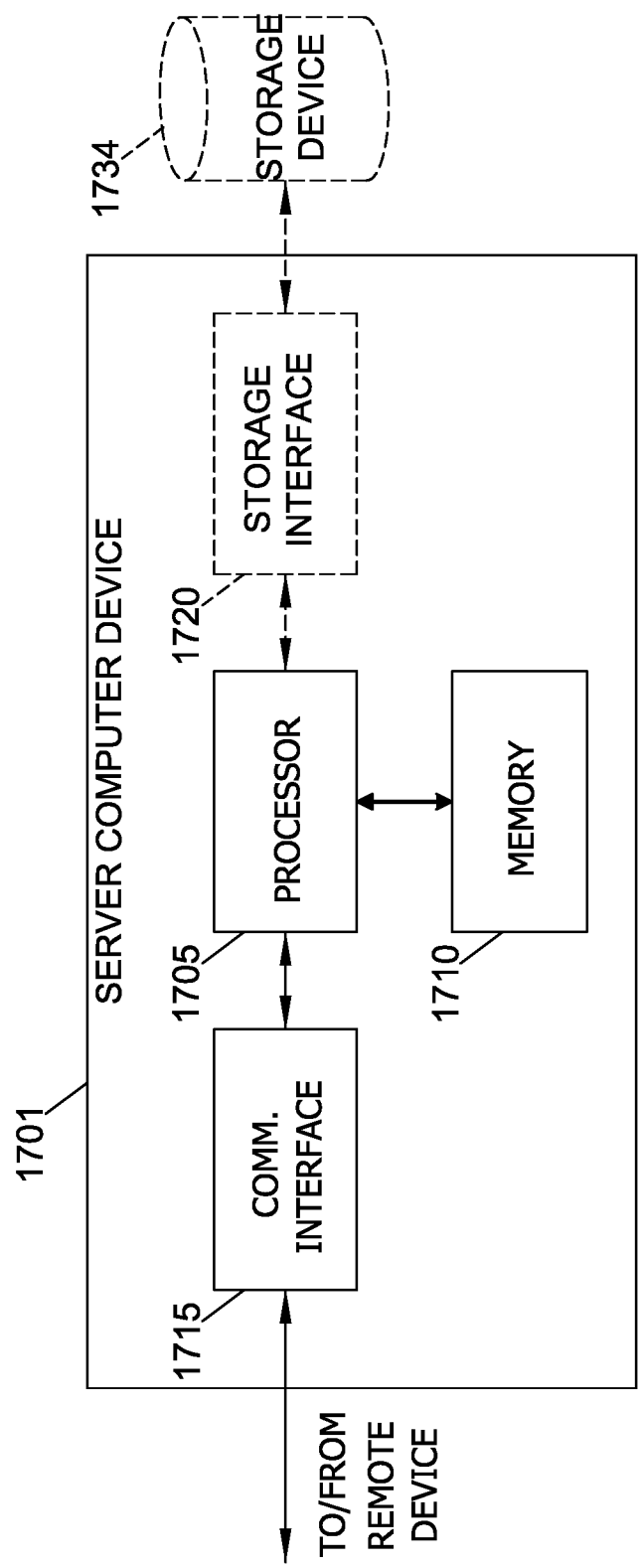
FIG. 17 illustrates an example configuration of a server computer device used in the projector system shown in FIG. 3, in accordance with one example of the present disclosure.

FIG. 17 illustrates an example configuration of a server computer device 1701 used in the projector system 300 (shown in FIG. 3), in accordance with one example of the present disclosure. Server computer device 1701 can include, but is not limited to, the projector controller 135 (shown in FIG. 1), the projector controller computer device 310, and the database server 315 (both shown in FIG. 3). The server computer device 1701 also includes a processor 1705 for executing instructions. Instructions can be stored in a memory area 1710. The processor 1705 can include one or more processing units (e.g., in a multi-core configuration).

The processor 1705 is operatively coupled to a communication interface 1715 such that the server computer device 1701 is capable of communicating with a remote device such as another server computer device 1701, another projector controller computer device 310, or the client system 325 (shown in FIG. 3). For example, the communication interface 1715 can receive requests from the client system 325 via the Internet, as illustrated in FIG. 3.

The processor 1705 can also be operatively coupled to a storage device 1734. The storage device 1734 is any computer-operated hardware suitable for storing and/or retrieving data, such as, but not limited to, data associated with the database 320 (shown in FIG. 3). In some examples, the storage device 1734 is integrated in the server computer device 1701. For example, the server computer device 1701 can include one or more hard disk drives as the storage device 1734. In other examples, the storage device 1734 is external to the server computer device 1701 and can be accessed by a plurality of server computer devices 1701. For example, the storage device 1734 can include a storage area network (SAN), a network attached storage (NAS) system, and/or multiple storage units such as hard disks and/or solid state disks in a redundant array of inexpensive disks (RAID) configuration.

In some examples, the processor 1705 is operatively coupled to the storage device 1734 via a storage interface 1720. The storage interface 1720 is any component capable of providing the processor 1705 with access to the storage device 1734. The storage interface 1720 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1705 with access to the storage device 1734.

The processor 1705 executes computer-executable instructions for implementing aspects of the disclosure. In some examples, the processor 1705 is transformed into a special purpose microprocessor by executing computer-executable instructions or by otherwise being programmed. For example, the processor 1705 is programmed with instructions such as those shown in FIGS. 13-15.

Figure 18:
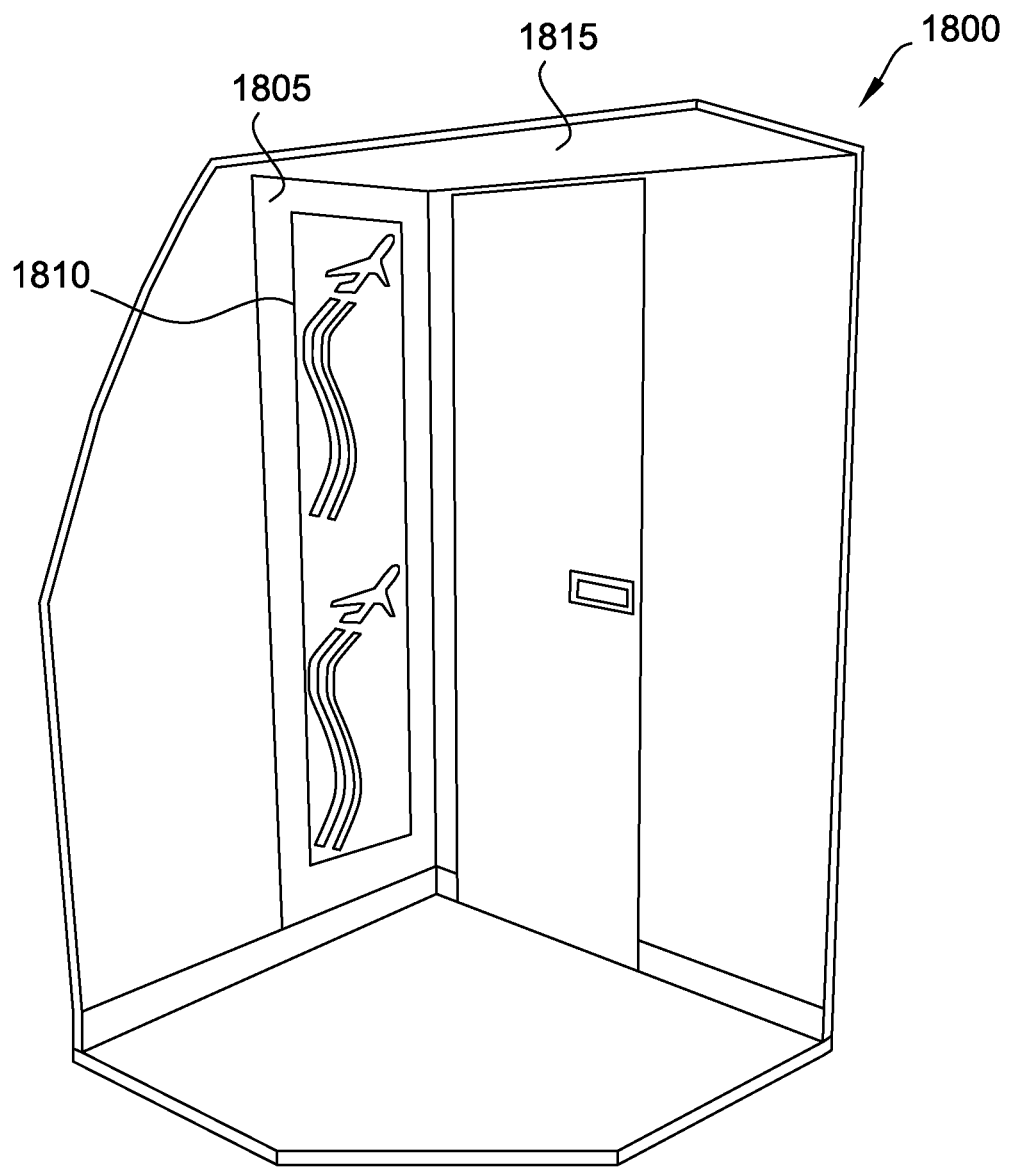
FIG. 18 illustrates a view of use of the projector systems shown in FIGS. 1, 2, and 3.

FIG. 18 illustrates a view 1800 of use of the projector systems 100, 200, and 300 (shown in FIGS. 1, 2, and 3). In view 1800, an image 1810 is being displayed on a feature wall 1805. The feature wall 1805 can be similar to wall 705 (shown in FIG. 7). The feature wall 1805 can be in the lavatory 1200 (shown in FIG. 12) and is activated when a viewer 120 (shown in FIG. 1) is detected in the lavatory 1200, such as when the triggering device 420 (shown in FIG. 4A) associated with the lock transmits a signal to the projector controller 135 (shown in FIG. 1) that the lock is in the locked position. While in FIG. 18, the image 1810 is displayed on a feature wall 1805, the image 1810 can also be displayed on a ceiling 1815.

Figure 19:
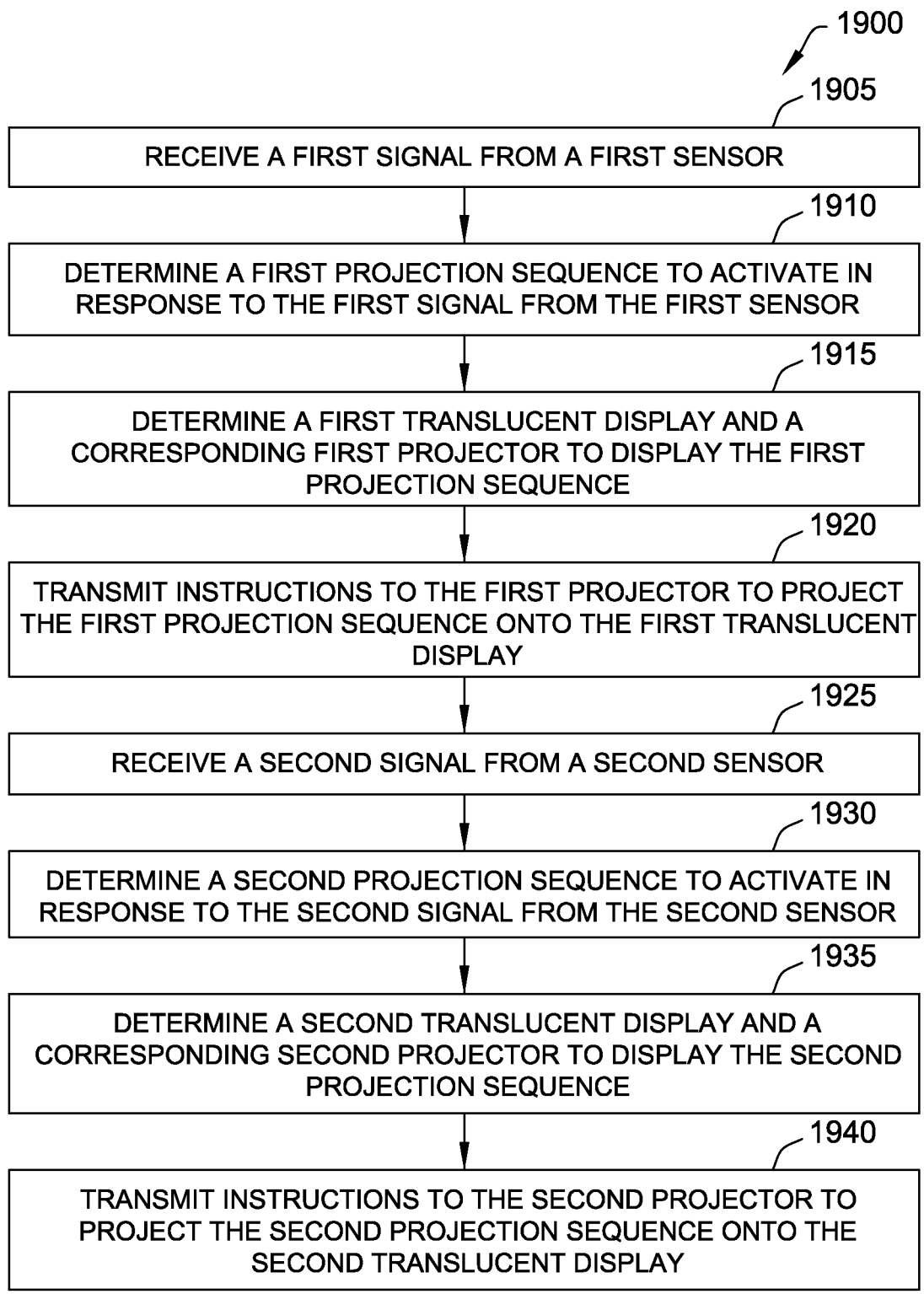
FIG. 19 illustrates another process for using the lavatory-projector system in accordance with at least one example.

FIG. 19 illustrates another process 1900 for using the lavatory-projector system in accordance with at least one example. Process 1900 is implemented by at least one of a projector controller 135 (shown in FIG. 1) and a projector controller computer device 310 (shown in FIG. 3) programmed to control a lavatory 1200 (shown in FIG. 12) with a plurality of translucent displays 105 (shown in FIG. 1). The lavatory 1200 can have translucent displays 105, such as, but not limited to, the countertops 405, the sink area 410, the splash back area 415 (all shown in FIG. 4A), the baby-changing station 605 (shown in FIG. 6), the wall 705 (shown in FIG. 7), or other surface, including but not limited to the toilet 1220, the toilet lid 1225, the toilet seat 1230, the toilet shroud 1235, the walls 1205, the floor 1210 (all shown in FIG. 12), the ceiling, the cabinet faces, and any other visible surface in the lavatory 1200. While process 1900 describes the use of a projector system 100, 200, and 300 (shown in FIGS. 1, 2, and 3, respectively) in a lavatory setting, the systems and methods described herein can also be used in vehicles, such as, but not limited to aircraft, watercraft, trains, buses, and spacecraft, and on other surfaces in the vehicle, such as, but not limited to, at passenger seats (e.g., tray tables), in galleys (e.g., work decks and sinks), passenger entryways (e.g., ceilings, floors, and walls), bar units (e.g., the countertops and fronts), and any other visible surface of the vehicle. Furthermore, these systems and methods would also be applicable to other environments, such as, but not limited to, bathrooms in homes and businesses (or hotels), kitchens, dining rooms, and other public areas of homes, businesses, or hotels.

In process 1900, the projector controller computer device 310 receives 1905 a first signal from a first sensor 305 (shown in FIG. 3). The first sensor 305 can include any sensor 305, such as, but not limited to, a door lock sensor, a flush sensor, a faucet sensor, a motion sensor, a thermal sensor, and an automatic paper towel dispenser sensor. The projector controller computer device 310 determines 1910 a first projection sequence to display in response to the first signal from the first sensor 305. A projection sequence is an image, a series of images, and/or a video to be displayed on one or more translucent displays 105. The projector controller computer device 310 determines 1915 a first translucent display 105 (shown in FIG. 1) and a corresponding first projector 125 (shown in FIG. 1) to display the first projection sequence. The first translucent display can include a wall 705, a countertop 405, a ceiling, a floor 1210, a baby-changing station 605, a cabinet face, a splash back area 415, a sink area 410, a toilet 1220, a toilet shroud 1235, a toilet seat 1230, and a toilet lid 1225. The projector controller computer device 310 transmits instructions 1920 to the first projector 125 to project the first projection sequence on a projection face 115 (shown in FIG. 1) of the first translucent display 105. Such that the first projection sequence is displayed on a display face 110 (shown in FIG. 1) of the first translucent display 105. The projection face 115 is an opposite side of the first translucent display 105 from the display face 110 of the first translucent display 105. The projector 125 projects the image 130 in reverse onto the projection face 115, so that the image 130 can be displayed in proper orientation on the display face 110 to the viewer 120.

The first sensor 305 can be a faucet sensor, and the projector controller computer device 310 determines that the first translucent display is the sink area face 510 (shown in FIG. 5). The projector controller computer device 310 instructs 1920 the projector 125 associated with the sink area face 510 to display the first projection sequence.

The projector controller computer device 310 receives 1925 a second signal from a second sensor 305. The second sensor 305 can include any sensor 305, such as, but not limited to, a door lock sensor, a flush sensor, a faucet sensor, a motion sensor, a thermal sensor, and an automatic paper towel dispenser sensor. The projector controller computer device 310 determines 1930 a second projection sequence to display in response to the second signal from the second sensor 305. The projector controller computer device 310 determines 1935 a second translucent display 105 and a corresponding second projector 125 to display the second projection sequence. The second translucent display can include a wall 705, a countertop 405, a ceiling, a floor 1210, a baby-changing station 605, a cabinet face, a splash back area 415, a sink area 410, a toilet 1220, a toilet shroud 1235, a toilet seat 1230, and a toilet lid 1225. The projector controller computer device 310 transmits instructions 1940 to the second projector 125 to project the second projection sequence on a projection face 115 of the second translucent display 105. Such that the second projection sequence is displayed on a display face 110 of the second translucent display 105. The projection face 115 is an opposite side of the second translucent display 105 from the display face 110 of the second translucent display 105. The projector 125 projects the image 130 in reverse onto the projection face 115, so that the image 130 can be displayed in proper orientation on the display face 110 to the viewer 120.

The second sensor 305 can be associated with an automatic paper towel dispenser, and the projector controller computer device 310 determines that the second translucent display is the splash back area 415. The projector controller computer device 310 instructs 1920 the projector 125 associated with the splash back area 415 to display the second projection sequence.

The projector controller computer device 310 receives a third signal from a third sensor 305. The third sensor 305 can include any sensor 305, such as, but not limited to, a door lock sensor, a flush sensor, a faucet sensor, a motion sensor, a thermal sensor, and an automatic paper towel dispenser sensor. The projector controller computer device 310 determines a third projection sequence to display in response to the third signal from the third sensor 305. The projector controller computer device 310 determines a third translucent display 105 and a corresponding third projector 125 to display the third projection sequence. The third translucent display can include a wall 705, a countertop 405, a ceiling, a floor 1210, a cabinet face, a splash back area 415, a sink area 410, a toilet 1220, a toilet shroud 1235, a toilet seat 1230, and a toilet lid 1225. The projector controller computer device 310 transmits instructions 1940 to the third projector 125 to project the third projection sequence on a projection face 115 of the third translucent display 105. Such that the third projection sequence is displayed on a display face 110 of the third translucent display 105. The projection face 115 is an opposite side of the third translucent display 105 from the display face 110 of the third translucent display 105. The projector 125 projects the image 130 in reverse onto the projection face 115, so that the image 130 can be displayed in proper orientation on the display face 110 to the viewer 120.

The projector controller computer device 310 receives a fourth signal from a fourth sensor 305. The fourth sensor 305 can include any sensor 305, such as, but not limited to, a door lock sensor, a flush sensor, a faucet sensor, a motion sensor, a thermal sensor, and an automatic paper towel dispenser sensor. The projector controller computer device 310 determines a fourth projection sequence to display in response to the fourth signal from the fourth sensor 305. The projector controller computer device 310 transmits instructions 1940 to the third projector 125 to project the fourth projection sequence on a projection face 115 of the third translucent display 105. Such that the fourth projection sequence is displayed on a display face 110 of the third translucent display 105.

The projector controller computer device 310 can also determine a fourth translucent display 105 and corresponding fourth projector 125 to display the fourth projection sequence.

The methods and system described herein can be implemented using computer programming or engineering techniques including computer software, firmware, hardware, or any combination or subset. As disclosed above, there is a need for systems providing a cost-effective and reliable manner for customizing surfaces. The system and methods described herein address that need. Additionally, this system: (i) allows customization of surfaces without requiring change of equipment; (ii) allows changing the customization of surfaces without requiring changing of equipment; (iii) provides interaction based on user actions; (iv) provides safety features for a movable translucent display; (v) provides a safe location for caring to a baby's needs; and (iv) provides unique lavatory experiences.

The methods and systems described herein can be implemented using computer programming or engineering techniques including computer software, firmware, hardware, or any combination or subset thereof, wherein the technical effects can be achieved by performing at least one of the following steps: a) instruct the at least one projector to project at least one image on the translucent display when the baby-changing station is in the first position; b) receive a signal from the at least one sensor indicating that the baby-changing station is in between the first position and the second position; c) instruct the at least one projector to halt projection of images; d) project the at least one image on the projection face of the translucent display, and wherein the at least one image is displayed on the display face; e) project the at least one image on the projection face in reverse such that the at least one image is displayed in proper orientation on the display face; f) project the at least one image through the lens to the translucent display; g) receive the at least one image from the at least one projector and transmit the at least one image through the lens to the translucent display; h) instruct the at least one projector to open the shutter when the baby-changing station is in the first position; i) instruct the at least one projector to close the shutter when the baby-changing station is not in the first position; j) receive a signal from the at least one sensor indicating that the indicating that the baby-changing station is in the first position; k) instruct the at least one projector to resume projection of images; and l) project one of a series of images and a video.

The methods and systems can also be achieved by performing at least one of the following steps: a) receiving a first signal from a first sensor; b) determining a first projection sequence to activate in response to the first signal from the first sensor, wherein the first sensor is a door lock sensor; c) determining a first translucent display and a corresponding first projector to display the first projection sequence in response to the first signal from the first sensor, wherein the first translucent display is a baby-changing station in a stowed position; d) transmitting instructions to the first projector to project the first projection sequence onto a projection face of the first translucent display, such that the first projection sequence is displayed on a display face of the first translucent display, wherein the projection face is an opposite side of the first translucent display from the display face of the first translucent display; e) receiving a second signal from a second sensor indicating a change in position of the first translucent display, wherein the second sensor is one of a proximity switch, a magnetic switch, a level switch, a tilt/displacement switch a radial switch, a mercury switch, and a latch sensor; f) determining to halt projection of the first projection sequence in response to the second signal; g) transmitting instructions to the first projector to halt projection of the first projection sequence; receiving a third signal from the second sensor indicating that the first translucent display is in the stowed position; h) transmitting instructions to the first projector to resume projection of the first projection sequence; i) transmitting instructions to the first projector and a second projector associated with a second translucent display to display the first projection sequence on the display face of the first translucent display and the second translucent display, such that the first projection sequence is displayed on a display face of the second translucent display, wherein the second translucent display is different from the first translucent display; j) transmitting instructions to the first projector to halt projection of the first projection sequence in response to the second signal while the second projector continues to project the first projection sequence on the second translucent display; k) synchronizing the display of the first projection sequence by first projector and the second projector; l) receiving a third signal from the first sensor indicating that a door lock has been unlocked; and m) instructing the first projector to activate a sleep mode.

The methods and systems can further be achieved by performing at least one of the following steps: a) receive a signal from the at least one sensor indicating that the baby-changing station is in the stowed position; b) instruct the projector to project at least one image on the translucent display; c) receive a signal from the at least one sensor indicating that the baby-changing station is no longer in the stowed position; d) instruct the projector to halt projection of the at least one image; e) receive a signal from the at least one sensor indicating that the baby-changing station is back in the stowed position; and f) instruct the projector to resume projection of the at least one image.

The computer-implemented methods discussed herein can include additional, less, or alternate actions, including those discussed elsewhere herein. The methods can be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein can include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein can be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a baby-changing station comprising a translucent display, the baby-changing station configured to be moveable between a first position and a second position;
   at least one projector configured to project an image on the translucent display; and
   a projector controller in communication with the at least one projector, wherein the projector controller is programmed to:
   instruct the at least one projector to project at least one image on the translucent display when the baby-changing station is in the first position.

2. The system of claim 1, further comprising a first sensor, wherein in the projector controller is further programmed to instruct the at least one projector to project at least a first image in response to a signal from the first sensor.

3. The system of claim 2, further comprising a second sensor, wherein the at least one projector is further programmed to instruct the at least one projector to halt projection in response to a signal from the second sensor.

4. The system of claim 3, wherein the projector controller is further programmed to:
   receive a signal from the second sensor indicating that the indicating that the baby-changing station is in the first position; and
   instruct the at least one projector to resume projection of images.

5. The system of claim 3, wherein the at least one projector is further programmed to receive the signal from the second sensor indicating that the baby-changing station is in between the first position and the second position.

6. The system of claim 2, further comprising a third sensor, wherein the projector controller is further programmed to:
   receive a signal from the third sensor; and
   instruct the at least one projector to project at least a second image on the translucent display in response to the signal from the third sensor.

7. The system of claim 6, wherein the first sensor comprises one or more of a door lock sensor, a flush sensor, a faucet sensor, an automatic paper towel dispenser sensor, or a hygiene device triggering sensor, and wherein the third sensor comprises one or more of a door lock sensor, a flush sensor, a faucet sensor, an automatic paper towel dispenser sensor, or a hygiene device triggering sensor.

8. The system of claim 6, wherein the first sensor comprises one or more of a motion sensor, an infrared sensor, a light sensor, a sensor that detects the activation of a device, a sensor that detects the use of a device, or a sensor that detects changing a position of at least a portion of a device, and wherein the third sensor comprises one or more of a motion sensor, an infrared sensor, a light sensor, a sensor that detects the activation of a device, a sensor that detects the use of a device, or a sensor that detects changing a position of at least a portion of a device.

9. The system of claim 1, wherein the translucent display includes a display face and a projection face, wherein the at least one projector is configured to project the at least one image on the projection face of the translucent display, and wherein the at least one image is displayed on the display face.

10. The system of claim 9, wherein the at least one projector is configured to project the at least one image on the projection face in reverse such that the at least one image is displayed in proper orientation on the display face.

11. The system of claim 1, wherein the at least one projector is configured to project one of a single image, a series of images, or a video.

12. A method for operating a projector system, where the method is implemented by a computing device comprising at least one processor in communication with at least one memory device, the method comprising:

receiving a first signal from a first sensor;

determining a first projection sequence to activate in response to the first signal from the first sensor;

determining a first translucent display and a corresponding first projector to display the first projection sequence in response to the first signal from the first sensor, wherein the first translucent display is a baby-changing station in a stowed position; and transmitting instructions to the first projector to project the first projection sequence onto a projection face of the first translucent display, such that the first projection sequence is displayed on a display face of the first translucent display, wherein the projection face is an opposite side of the first translucent display from the display face of the first translucent display.

13. The method of claim 12 further comprising:

receiving a second signal from a second sensor indicating a change in position of the first translucent display;

determining to halt projection of the first projection sequence in response to the second signal; and transmitting instructions to the first projector to halt projection of the first projection sequence.

14. The method of claim 13 further comprising:

receiving a third signal from the second sensor indicating that the first translucent display is in the stowed position; and transmitting instructions to the first projector to resume projection of the first projection sequence.

15. The method of claim 12 further comprising:

receiving a signal from a third sensor; and instructing the first projector to project at least a second image on the first translucent display in response to receiving the signal from the third sensor.

16. The method of claim 15, wherein the first sensor comprises one or more of a door lock sensor, a flush sensor, a faucet sensor, an automatic paper towel dispenser sensor, or a hygiene device triggering sensor, and wherein the third sensor comprises one or more of a door lock sensor, a flush sensor, a faucet sensor, an automatic paper towel dispenser sensor, or a hygiene device triggering sensor.

17. The method of claim 15, wherein the first sensor comprises one or more of a motion sensor, an infrared sensor, a light sensor, a sensor that detects the activation of a device, a sensor that detects the use of a device, or a sensor that detects changing a position of at least a portion of a device, and wherein the third sensor comprises one or more of a motion sensor, an infrared sensor, a light sensor, a sensor that detects the activation of a device, a sensor that detects the use of a device, or a sensor that detects changing a position of at least a portion of a device.

18. A lavatory comprising:

a baby-changing station comprising a translucent display, wherein the translucent display comprises a first face, and an opposite second face, wherein the first face is visible, and wherein the baby-changing station is attached to a wall of the lavatory, and wherein the baby-changing station is configured to transition between a stowed position and a deployed position;

a projector positioned behind the wall that the baby-changing station is attached to, the projector configured to project on the second face of the translucent display; and a computing device comprising at least one processor in communication with at least one memory device, wherein the computing device is in communication with a first sensor and the projector, and wherein the at least one processor is programmed to:

receive a first signal from the first sensor; and instruct the projector to project at least one image on the translucent display in response to the first signal from the first sensor.

19. The lavatory of claim 18, wherein the at least one processor is further programmed to:

receive a second signal indicating that the baby-changing station is no longer in the stowed position;

instruct the projector to halt projection of the at least one image;

receive a third signal indicating that the baby-changing station is back in the stowed position; and instruct the projector to resume projection of the at least one image.

20. The lavatory of claim 19, wherein the first sensor comprises one or more of a door lock sensor, a flush sensor, a faucet sensor, an automatic paper towel dispenser sensor, a hygiene device sensor, a motion sensor, an infrared sensor, a light sensor, a sensor that detects the activation of a device, a sensor that detects the use of a device, or a sensor that detects changing a position of at least a portion of a device.

* * * * *

UNITED STATES PATENT AND TRADEMARK OFFICE
CERTIFICATE OF CORRECTION

PATENT NO. : 11,720,011 B2
APPLICATION NO. : 17/581175
DATED : August 8, 2023
INVENTOR(S) : Darren Carl McIntosh It is certified that error appears in the above-identified patent and that said Letters Patent is hereby corrected as shown below:

In the Specification

In Column 3, Line 46, delete "Conan" and insert therefor -- Corian --.
In Column 6, Line 1, delete "Conan" and insert therefor -- Corian --.
In Column 10, Line 32, delete "Conan" and insert therefor -- Corian --.

Signed and Sealed this
Twenty-first Day of November, 2023

Katherine Kelly Vidal
*Director of the United States Patent and Trademark Office*